(12) United States Patent
Kostrzewski et al.

(10) Patent No.: US 8,797,406 B2
(45) Date of Patent: Aug. 5, 2014

(54) OMNIDIRECTIONAL IMAGING OPTICS WITH 360°-SEAMLESS TELESCOPIC RESOLUTION

(71) Applicants: Andrew Kostrzewski, Garden Grove, CA (US); Tomasz Jannson, Torrance, CA (US); Ranjit Pradhan, Torrance, CA (US); Nathanael Keehoon Kim, Rancho Palos Verdes, CA (US); Wenjian Wang, Torrance, CA (US)

(72) Inventors: Andrew Kostrzewski, Garden Grove, CA (US); Tomasz Jannson, Torrance, CA (US); Ranjit Pradhan, Torrance, CA (US); Nathanael Keehoon Kim, Rancho Palos Verdes, CA (US); Wenjian Wang, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 13/786,149

(22) Filed: Mar. 5, 2013

(65) Prior Publication Data

US 2013/0250043 A1    Sep. 26, 2013

Related U.S. Application Data

(62) Division of application No. 12/871,811, filed on Aug. 30, 2010.

(60) Provisional application No. 61/311,880, filed on Mar. 9, 2010.

(51) Int. Cl.
*H04N 7/18* (2006.01)
*H04N 5/232* (2006.01)
*G02B 5/09* (2006.01)

(52) U.S. Cl.
CPC . *H04N 5/232* (2013.01); *G02B 5/09* (2013.01)
USPC .......................................................... 348/143

(58) Field of Classification Search
CPC .................................. H04N 5/232; G02B 5/09
USPC ...................................................... 348/41–161
See application file for complete search history.

(56) References Cited

U.S. PATENT DOCUMENTS

| | | | | |
|---|---|---|---|---|
| 5,729,383 | A * | 3/1998 | Chastang et al. | 359/385 |
| 6,449,103 | B1 * | 9/2002 | Charles | 359/725 |
| 6,769,769 | B2 * | 8/2004 | Podoleanu et al. | 351/221 |
| 7,553,023 | B2 * | 6/2009 | Grover | 353/7 |
| 7,667,833 | B1 * | 2/2010 | Diver | 356/138 |
| 7,796,152 | B2 * | 9/2010 | Grover | 348/42 |
| 7,875,865 | B2 * | 1/2011 | Scholz et al. | 250/492.2 |
| 8,111,296 | B2 * | 2/2012 | Min-Seok | 348/218.1 |
| 8,513,628 | B2 * | 8/2013 | Scholz et al. | 250/504 R |
| 2005/0231651 | A1 * | 10/2005 | Myers et al. | 348/744 |
| 2008/0272281 | A1 * | 11/2008 | Stromberg et al. | 250/216 |
| 2011/0043604 | A1 * | 2/2011 | Peleg et al. | 348/36 |
| 2011/0085021 | A1 * | 4/2011 | Wang et al. | 348/36 |
| 2011/0095977 | A1 * | 4/2011 | Ung | 345/158 |

* cited by examiner

*Primary Examiner* — Sath V Perungavoor
*Assistant Examiner* — Talha Nawaz
(74) *Attorney, Agent, or Firm* — Sheppard Mullin Richter & Hampton LLP

(57) ABSTRACT

A multifacet mirror comprises a catoptric structure configured to reflect light from a first field of view onto an image plane comprising a plurality of sensors, the catoptric structure having a surface comprising a plurality of facets separated by a plurality of catoptric regions; wherein a facet of the plurality of the facets has a second field of view that is smaller than the predetermined field of view; and wherein a catoptric region of the plurality of catoptric regions between two facets of the plurality of facets is configured to reflect light from a world point within the first field of view onto two of the sensors of the plurality of sensors.

18 Claims, 20 Drawing Sheets

OMNIDIRECTIONAL IMAGING OPTICS WITH 360°-SEAMLESS TELESCOPIC RESOLUTION

CROSS-REFERENCE TO RELATED APPLICATIONS

This application is a divisional application of U.S. application Ser. No. 12/871,811, filed Aug. 30, 2010, which claims the benefit of U.S. Provisional Application No. 61/311,880, filed Mar. 9, 2010.

TECHNICAL FIELD

The present invention relates generally to optics, and more particularly, some embodiments relate to omnidirectional imaging.

DESCRIPTION OF THE RELATED ART

The ultimate goal of omnidirectional imaging optics is to realize 360°—seamless telescopic resolution; i.e., with less than 1 mrad, equivalent, for example, to resolution of 1 m per 1 km distance, within some range of elevation angles, where 360°—means full azimuthal angle. Prior omnidirectional imaging systems only partially realize this goal by directing a telescopic camera into specific narrow FOV (field of view) regions. By moving the camera, high resolution may be achieved at a given azimuthal angle, but not, at the same time for all angles, limiting such solutions to a single target at a given time. Increasing the number of such high-resolution cameras, or even placing therefore include overlapping regions that allows the image processing modules to stitch the images together into a composite image by aligning the overlapping regions.

According to an embodiment of the invention, a multi-facet mirror comprises a catoptric structure configured to reflect light from a first field of view onto an image plane comprising a plurality of sensors, the catoptric structure having a surface comprising a plurality of facets separated by a plurality of catoptric regions; wherein a facet of the plurality of the facets has a second field of view that is smaller than the predetermined field of view; and wherein a catoptric region of the plurality of catoptric regions between two facets of the plurality of facets is configured to reflect light from a world point within the first field of view onto two of the sensors of the plurality of sensors.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom," "horizontal," or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention provides systems who seamless pixels and electronic zoom, called EL ZOOM, and electronic PTZ (or EL PTZ) which replace prior art mechanical (with motion) and electro-optical equivalents. The EL-PTZ does not necessarily have any mechanical parts (no motion), nor electro-optical parts, or acousto-optic parts. It is based on opto-electronic integration of well-established pixel arrays (PAs) similar to those used for present imaging optical cameras, into superpixel arrays (SPAs) that have obvious mechanical seams, but that are seamless optically; i.e., integrated omnidirectional image is seamless. This seamless property of the SPAs is due to a multifacet optical reflective component. The system achieves a high (telescopic) resolution as well as efficient electronic image stabilization without image actuators.

Analog angular image resolution is estimated from the Raleigh criterion, which is based on Airy (intensity) patterns, in the form:

$$y = \left[\frac{2J_1(x)}{x}\right]^2 \quad (1)$$

where $J_1(x)$ is the Bessel function of the 1st kind and 1st order, with x:

$$x = \pi d(\Delta\theta)/\lambda \quad (2)$$

where ($\Delta\theta$) is angular distance from the center, d is eyepiece (or projection lens) diameter, and $\lambda$ is optical wavelength (in air). The spatial distance from the center of the Airy pattern, $\delta$, is from Eq. (2):

$$\delta = f(\Delta\theta) = \frac{x\lambda f}{\pi d} = \frac{x\lambda}{\pi} f\# \quad (3)$$

where f is eyepiece focal length, and f#=f/d. The Airy pattern, described by Eq. (1), is a diffraction pattern with adjacent maxima and minima (rings), defined by the Bessel function, summarized in Table 1, for $\lambda$=0.5 μm, and f#=2.5.

TABLE 1

Maxima and Minima of Airy Pattern (Analog Resolution), for $\lambda$ = 0.5 μm and f# = 2.5

| Maximum/Minimum | x | δ | y |
|---|---|---|---|
| 1st maximum | 0 | 0 | 1 |
| 1st minimum (1$^{st}$ ring) | 1.22 π | 1.52 μm | 0 |
| 2nd maximum | 1.635 π | 2 μm | 0.0175 |
| 2nd minimum (2$^{nd}$ ring) | 2.233 π | 2.79 μm | 0 |

In digital imaging systems, resolution is impacted by the Nyquist criterion, which requires a sampling interval at least twice as high as the highest spatial frequency to be accurately preserved in the digital image. Assuming, for illustration, that the size of each pixel is 4 μm, and the space separating the pixels is 1 μm, (thus, the pitch is 5 μm), then the Nyquist resolution is 10 μm, or $\delta d_{(R)}$=10 μm.

Figure 1:
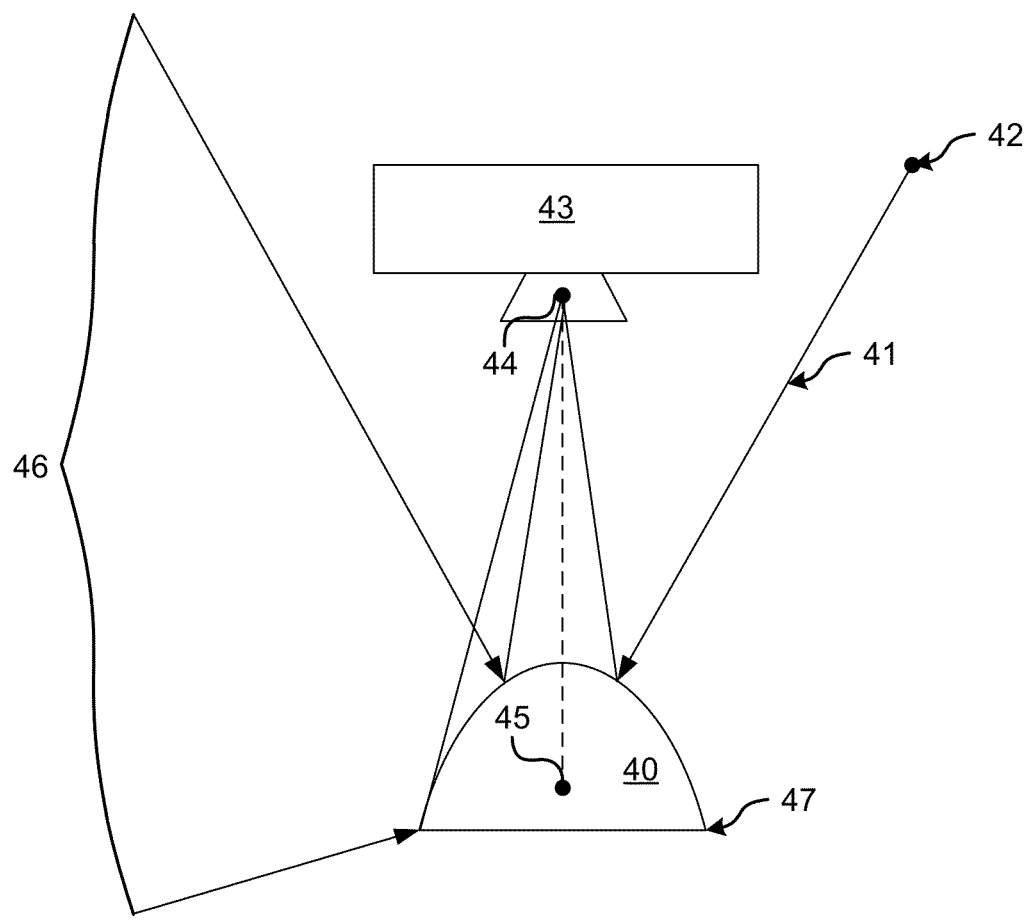
FIG. 1 illustrates a catadioptric system implemented in accordance with an embodiment of me invention.

FIG. 1 illustrates a general catadioptric system. A convex mirror 40 reflects incoming light rays 41 onto a camera 43, for example through a pinhole 44 (i.e., in a camera obscura). As used herein, the term, "pole" will refer to the point of the mirror closest to the focal region 44, and the term "equator" will refer to the circumference of the x-y cross section furthest from the pole (circumference 47 in the Figure), where the z direction is the direction normal to the focal plane.

The single-viewpoint criterion is the requirement that a catadioptric sensor only measure the intensity of light passing through a single point in 3-D space. This is equivalent to the fact that each world point 42, within δw-vicinity, and dv-infinitesimal solid angle, and dφ-its linear angle equivalent, has one chief ray 41, that, after reflection from the surface of mirror 40, passes the pinhole 44. Then, dv-angle transforms into dω angle, and then to dA-pixel area in camera 43. If the mirror 40 is hyperboloid with a first foci 45 and a second foci at pinhole 44, then the world lines 41 are those lines directed at the first foci 45. In at real catadioptric system, the pinhole is replaced by a lens and aperture. In this case, the chief ray is transformed into a bundle of rays from any world point, resulting in some blur.

To achieve 360° azimuthal (horizontal) view, the mirror 40 represents a shape that is swept through a full 360° rotation, such as a hyperboloid, or other rotationally symmetric shape. A vertical field of view 46 is defined by the camera placement and shape of the mirror 40.

Figure 2:
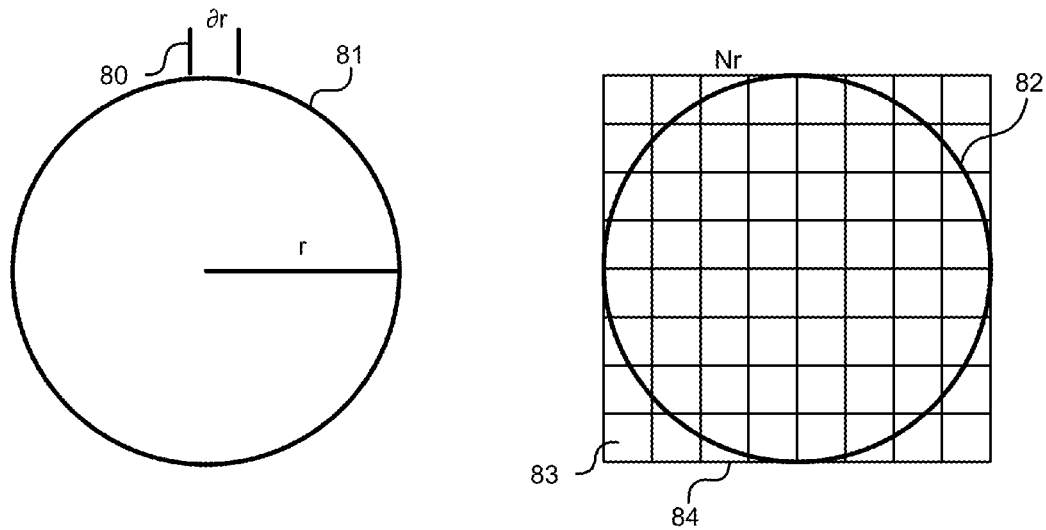
FIG. 2 illustrates an analog and digital imaging situation.

FIG. 2 illustrates a general digital imaging situation. In the figure, a circle 81 with radius r will be imaged by a pixel 83 array 84. The resolution of the image 82 is determined by the Nyquist criterion, which requires that the number of resolving elements 80 $2\pi r/\delta r$ should be half the number of equivalent pixels 83, $2\pi N_r$, where $N_r$ is the half-size of the equivalent pixel array 84.

$$\frac{2\pi r}{\delta r} = \frac{2\pi N_r}{2}; \quad (4)$$

$$N_r = \frac{2r}{\delta r}$$

The resolving power of the imaging system, $P_R$, is defined as the inverse of the system resolution in meters/km, such as 1 m/1 km, or 1 mrad; thus $$\frac{1}{P_R} = \frac{\delta_r}{r} \quad (5)$$

so, from Eq. (4):

$$N_r = 2P_R \quad (6)$$

Figure 3:
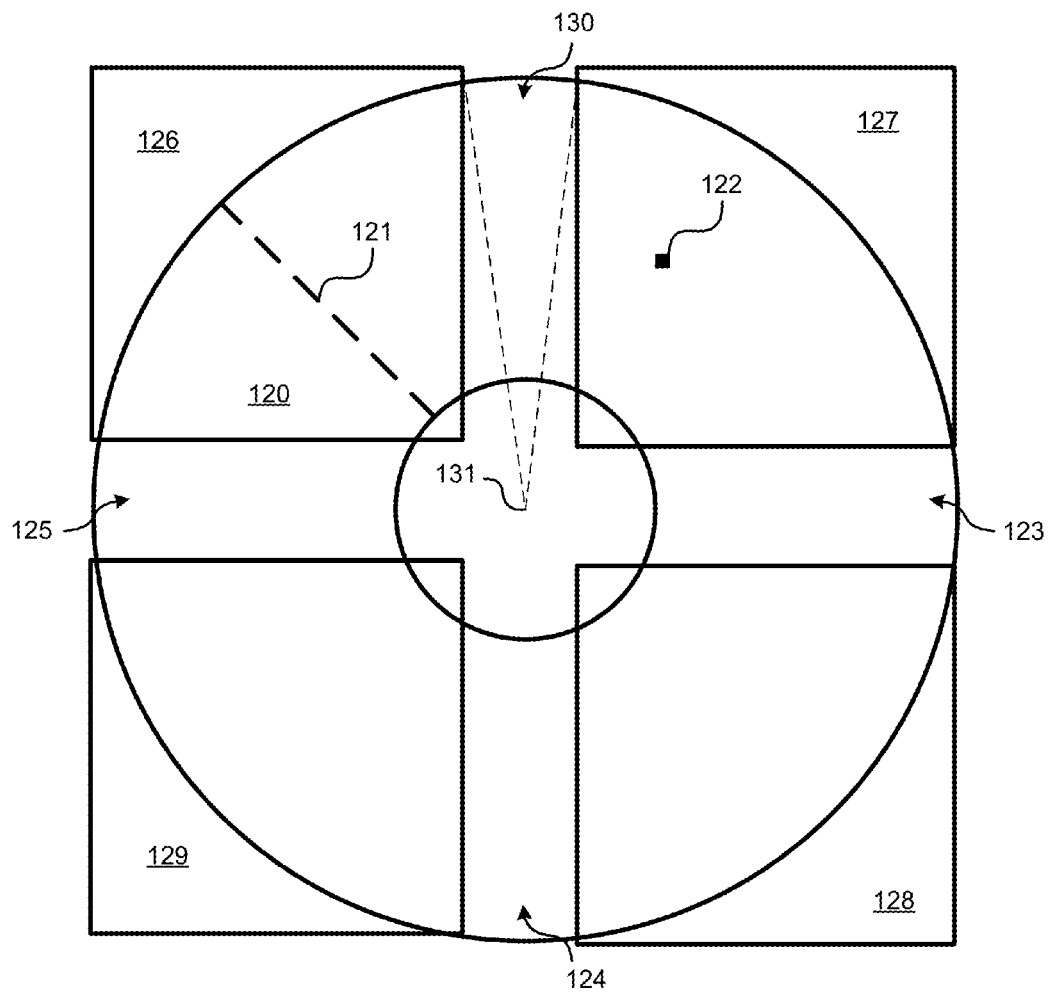
FIG. 3 illustrates a sensor array and non-recorded image portions from a single faceted catadioptric system.

FIG. 3 illustrates a system for increasing the resolving power of a catadioptric image. A catadioptric imaging system having a 360° azimuthal FOV forms an annular image 120 on the sensor plane. The distance 121 from the inner radius to the outer radius of the annulus is determined by the vertical FOV and mirror used. In the case of less than 360° azimuthal FOV the image formed will be a section of the annulus. Available digital image detectors, such as CCD or CMOS based detectors, "pixel arrays", have limited resolutions. In the illustrated embodiment, a plurality of pixel 122 arrays 126, 127, 128, and 129 are arranged in a super-array. For example, four quadratic 16-megapixel pixel arrays can be used to obtain a 64-megapixel super-array. If, in general, the half-size of a number of pixels for PA, is $N_r$, as in Eq. (6), then, this number increases twice, to $N_x$, to obtain:

$$N_x = 4P_R \quad (7)$$

This relation is summarized in Table 2, for various resolving powers.

TABLE 2

Pixel Resolution v.s. Resolving Power

| 1/$P_R$ | 1 m/1 km | 1 m/2 km | 1 m/3 km | 1 m/5 km | 1 m/10 km |
|---|---|---|---|---|---|
| 1/$P_R$ (radians) | 1 mrad | 0.5 mrad | 0.3 mrad | 0.2 mrad | 0.1 mrad |
| $P_R$ | 1,000 | 2,000 | 3,000 | 5,000 | 10,000 |
| $N_x$ | 4,000 | 8,000 | 12,000 | 20,000 | 40,000 |
| Megapixels | 16 | 64 | 144 | 400 | 1,600 |

Figure 4:
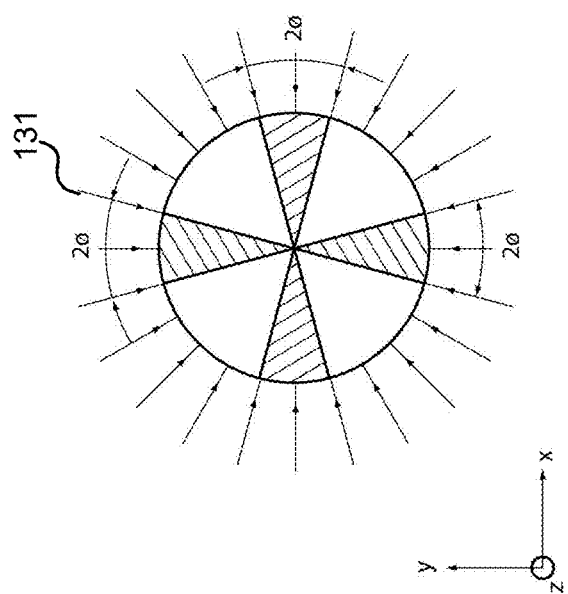
FIG. 4 illustrates a view of a cylindrical catoptric mirror illustrating the dead zones from a dead angle.

However, when tiling multiple image detectors, physical gaps 123, 124, 125, and 130 will exist between the sensors. In the case of an annular image 120 reflected off of a simple surface of revolution, such as a hyperboloid, the portions of the image 120 that exist at the gap regions are unable to be imaged. Accordingly, the rays from the omni-directional world points corresponding to those regions are lost. This results in non-imaged zones within a "dead angle" 131, 2φ. FIG. 4 illustrates a view of a cylindrical catoptric mirror illustrating the dead zones from the dead angle 131. As the figure illustrates, the effects of the dead zone increase in the vertical field in the direction towards the base of the mirror.

Figure 5A:
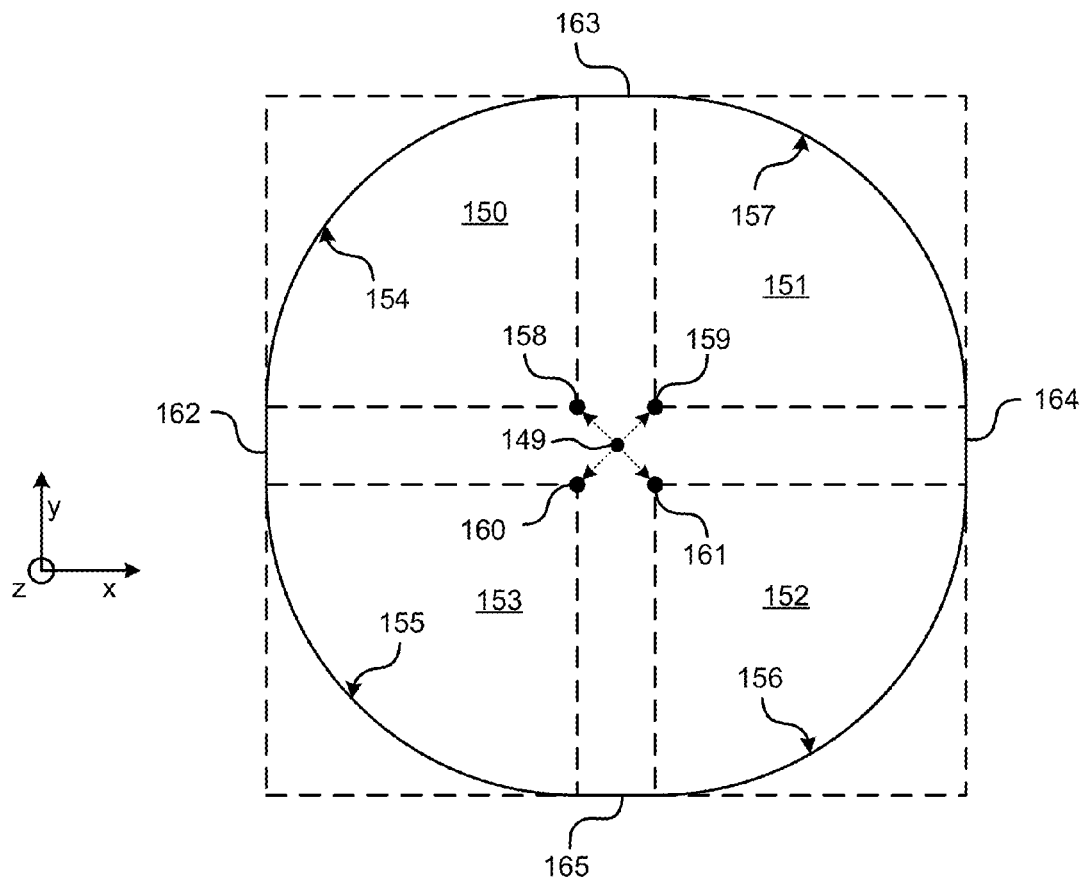
FIG. 5, consisting of FIGS. 5A and 5B, illustrates a catoptric structure with reduced or eliminated non-imaged zones implemented in accordance with an embodiment of the invention.
Figure 5B:
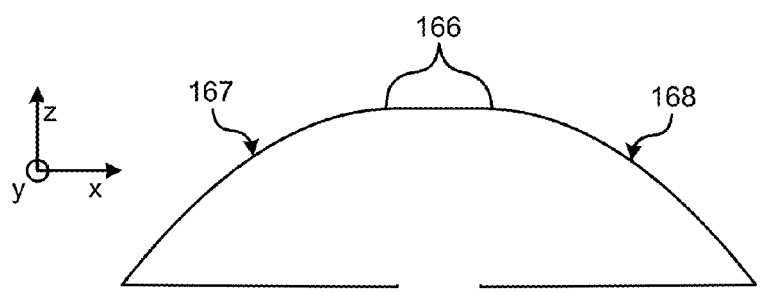

FIG. 5 illustrates a catoptric structure with reduced or eliminated non-imaged zones. FIG. 5A illustrates a top-down view of the resulting catoptric mirror, while FIG. 5B illustrates a side view of the catoptric mirror. The mirror comprises a plurality of facets 154, 155, 156, and 157. In one embodiment, the facets are connected by flat contours 162, 165, 164, and 163, and flat region 166. Each facet has a center of curvature, 158, 160, 161, and 159, respectively that is displaced from the center 149 of the mirror's circumference. Each facet then comprises a surface of revolution of a conic section or a skewed conic section, with the axis of rotation at the center of curvature. For example, in some embodiments each facet comprises a section of a paraboloid or a hyperboloid. To form the catoptric multi-facet mirror, in some embodiment, a plurality of sections of a paraboloids or hyperboloids are formed, for example, 95° sections of the surfaces of rotation. The sections are then joined together to form the multi-facet mirror having redundant seams between the facets.

In one embodiment, the displacement is such that the centers of curvatures correspond to the corners of the pixel arrays 150, 153, 152, and 151 on the image plane. Accordingly, in the illustrated embodiment all omni-direction chief rays are accepted by the mirror and mapped to a pixel array. Accordingly, no chief rays are lost in the regions between the pixel arrays. In some embodiments, the single viewpoint criterion is maintained by modifying the x-z profiles 167 and 168 of the mirror. In other embodiments, the single viewpoint criterion is maintained for each facet of the mirror such that each corresponding pixel array has a single viewpoint.

Figure 6A:
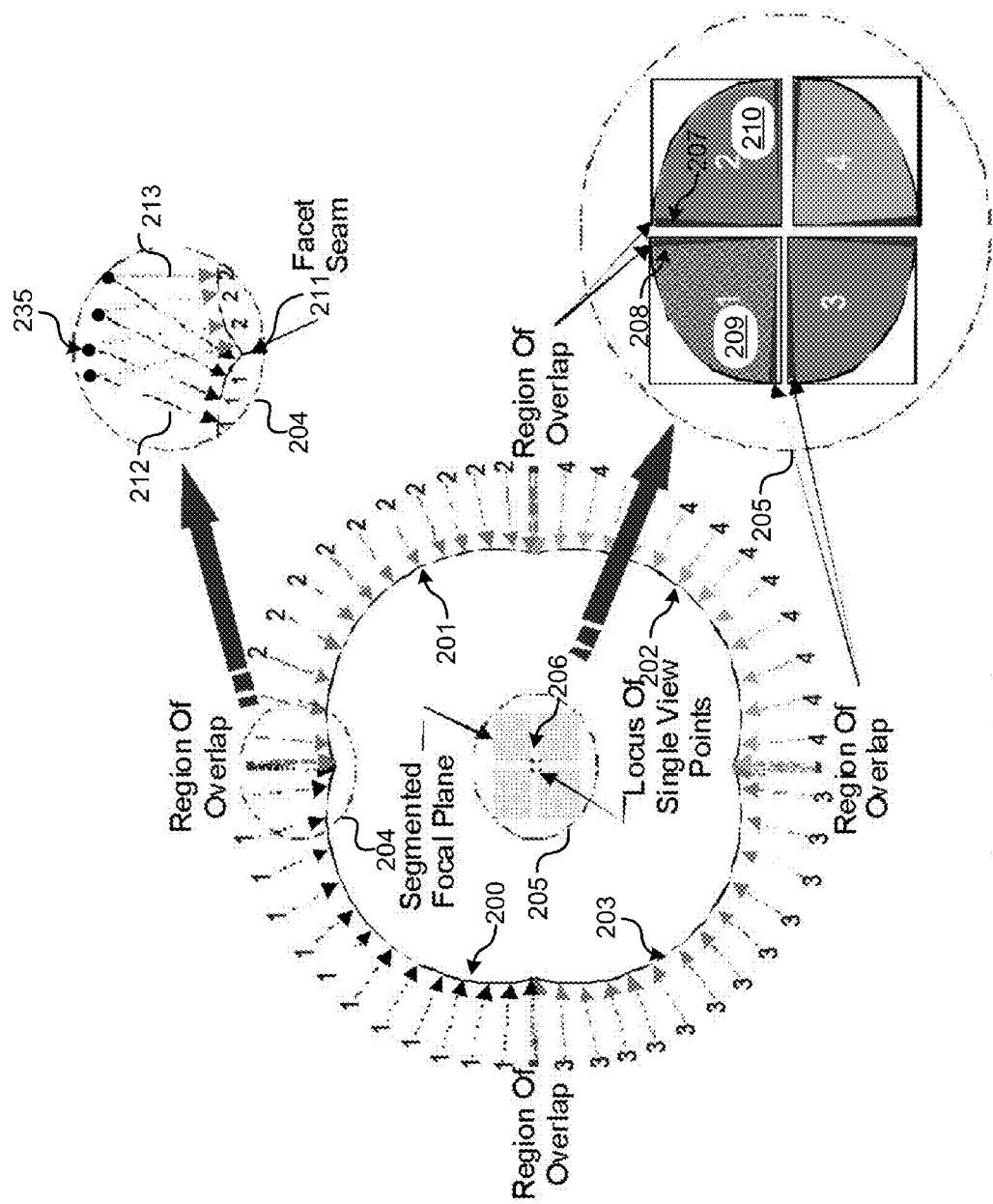
FIG. 6, consisting of FIGS. 6A, 6B, 6C, and 6D, illustrates a multifacet mirror system implemented in accordance with an embodiment of the invention.
Figure 6B:
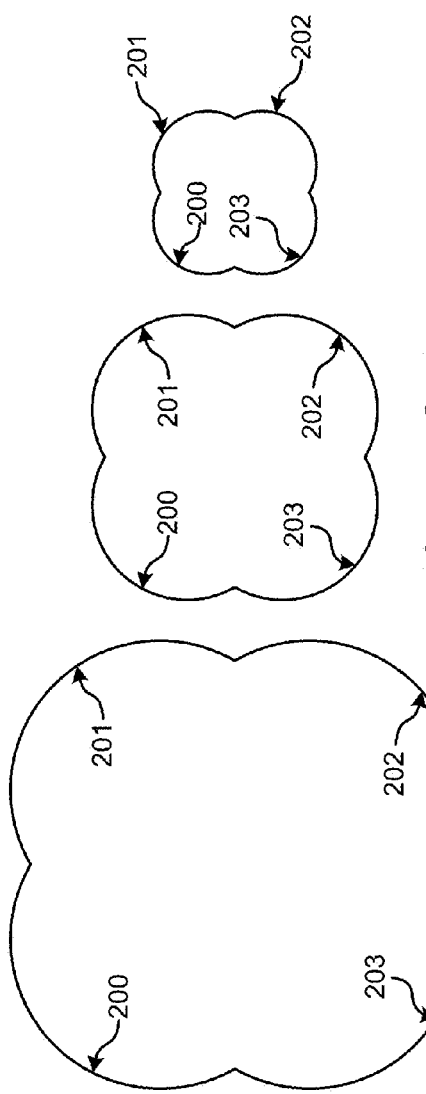
Figure 6D:
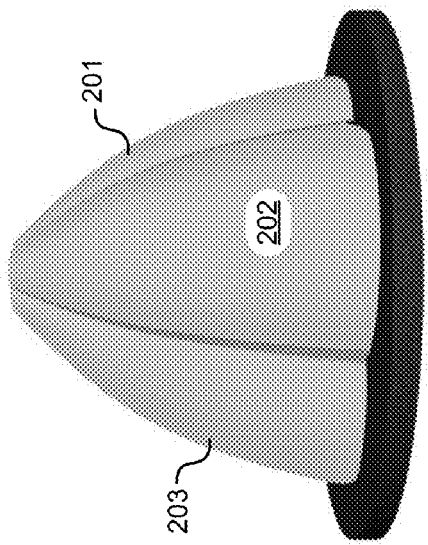
Figure 6C:
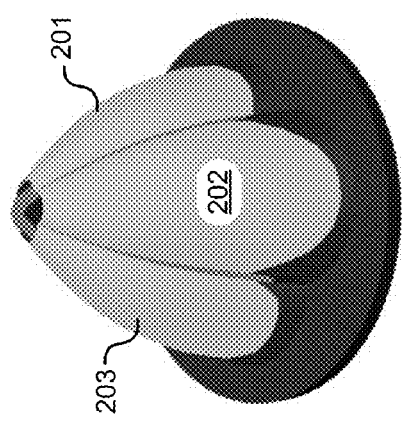

With flat contours 162, 165, 164, and 163 between the facets, the pixel array dimensions and spaces between the pixels and the facet dimensions should be precisely controlled, so that each facet of the mirror maps accurately to its corresponding pixel array. Otherwise, discontinuities may occur or information from some world points may be lost. FIG. 6 illustrates a multifacet mirror system that alleviates these restrictions. FIG. 6A illustrates the mirror in relation to the image sensor; FIG. 6B illustrates a plurality of x-y cross sections of the mirror; and FIGS. 6C and 6D illustrate two perspective views of the mirror. The catoptric mirror comprises a plurality of facets, 200, 201, 202, and 203 as before with respect to FIG. 5. Each facet has a focal point corresponding to a corner of a different pixel array, forming a locus 206 of single view points on the local plane. However, in this embodiment, the facets are joined in with concave seams 204, such as a cusp 211 with curvatures on either side of the seam that result in redundant or overlapping on the edges of the pixel arrays, such as regions 208 and 207 on pixel arrays 209 and 210. For example, in one embodiment, each facet of the mirror has a horizontal field of view between about 100° and 105°. Because of the seams 204, within an angular region determined by the dimensions of the seams 204, rays from world points are mapped to two separate pixel arrays. For example, in seam 204, rays 212 from world points 235 are imaged by pixel array 209 within region 208 and rays 213 are imaged by pixel array 210 within region 207. The redundant images created by concave contours of seams 204 are then used to stitch together the images from each pixel array in electronic image processing.

Figure 7:
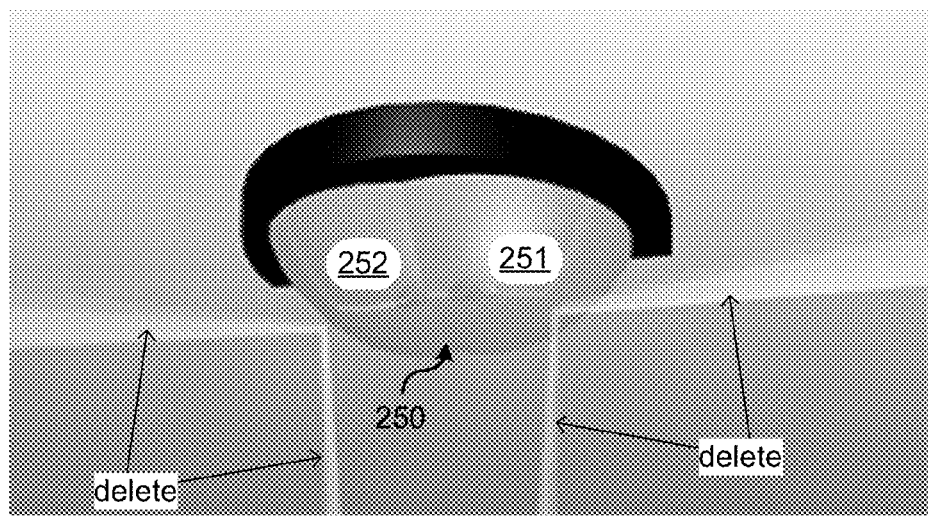
FIG. 7 illustrates a dual facet mirror implemented in accordance with an embodiment of the invention.
Figure 7:
Figure 7:
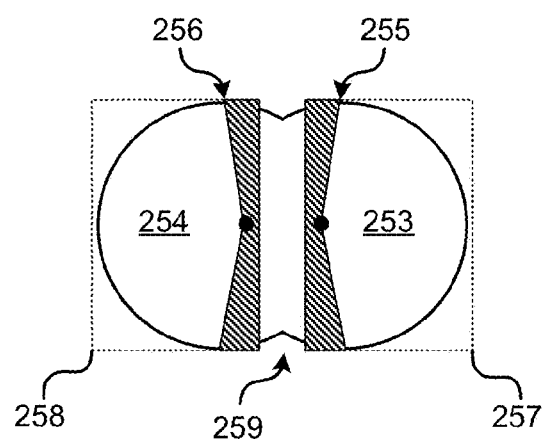
Figure 8:
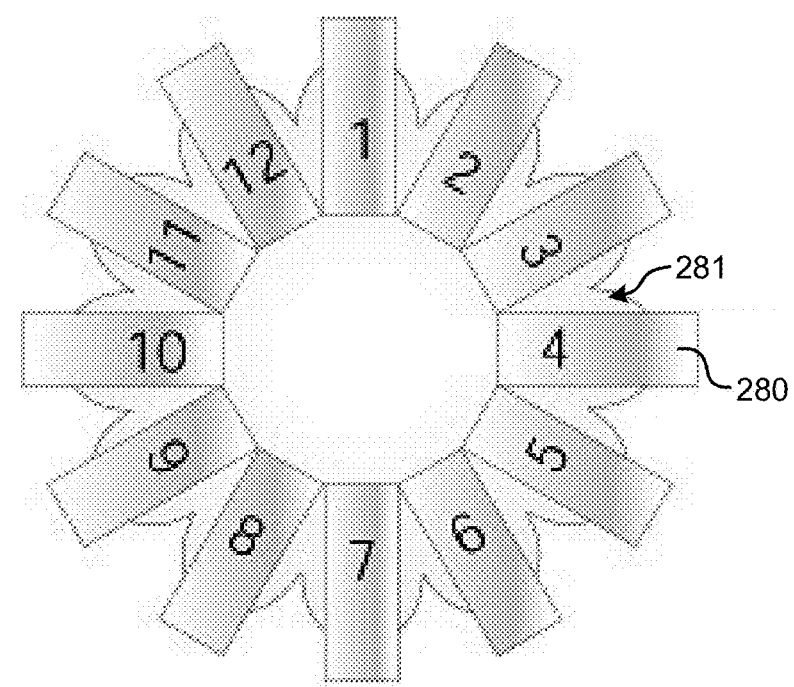
FIG. 8 illustrates a multifacet mirror system implemented in accordance with an embodiment of the invention.

In further embodiments, the number of facets in the catoptric mirror may be varied. For example, FIG. 7 illustrates a two facet catoptric mirror and its resulting image geometry. Facets 251 and 252 are separated by a concave seam 250. Accordingly, each of the facets has a higher than 180° FOV, resulting in regions of overlap 255 and 256 in the images 254 and 253 on the sensor plane. Each pixel array 258 and 257 therefore has a overlapping redundant area that allows the images to be stitched together in electronic image processing without losing rays in the gap 259 between the sensors. FIG. 8 illustrates a 12 facet catoptric mirror 281 and a corresponding array of 12 image sensors 280. If for example, each of the image sensors 280 had a resolution of 1,080×1,920, corresponding to commercially available HDTV camcorder sensors, then the catadioptric system would have an ultimate resolution of about 12,980×1,920 pixels.

Figure 9:
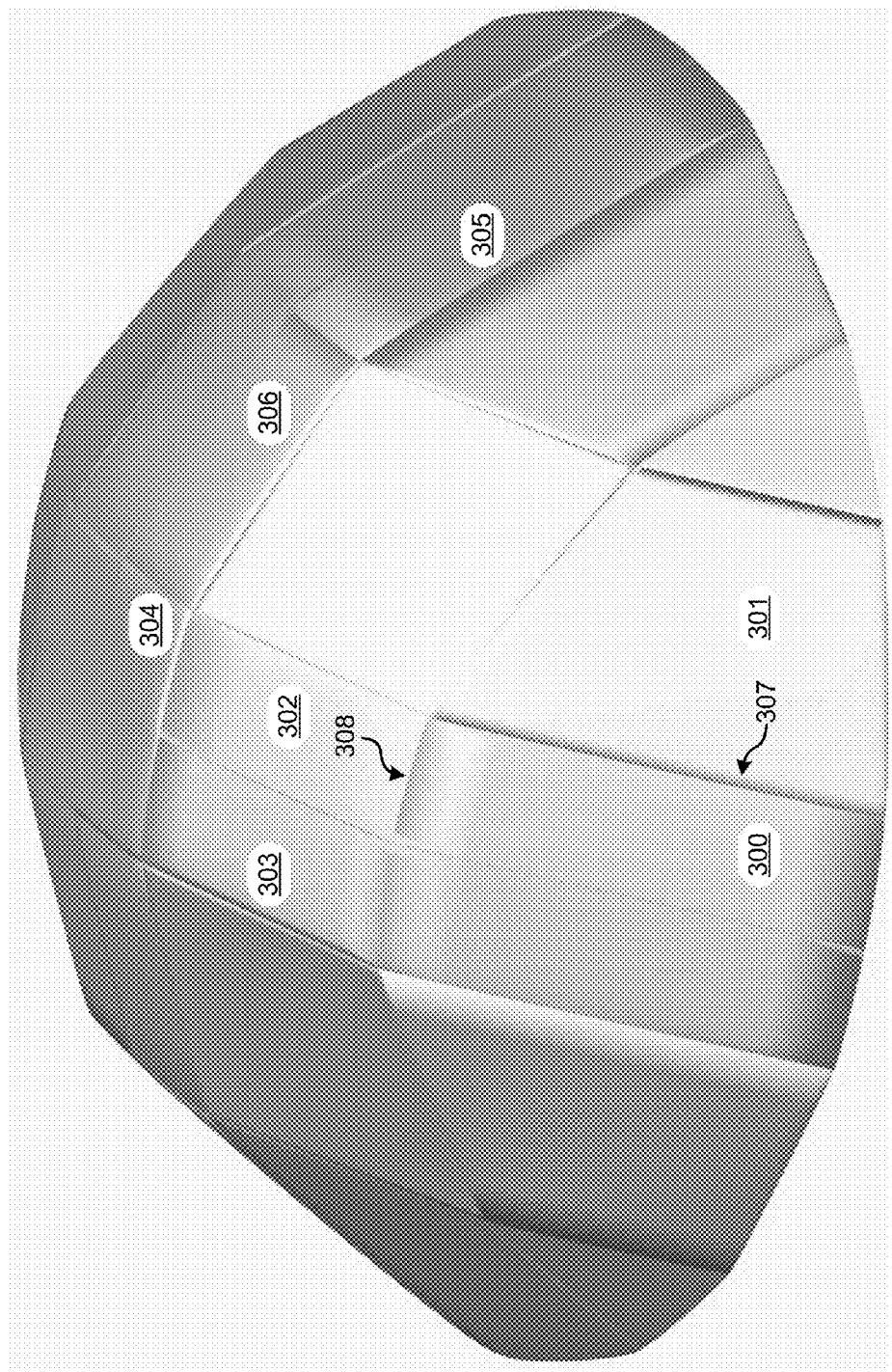
FIG. 9 illustrates a multifacet mirror system with azimuthal and horizontal facets implemented in accordance with an embodiment of the invention.

In still further embodiments, multifacet catoptric mirrors may have facets that are separated azimuthally as well as circumferentially. FIG. 9 illustrates one such multifacet mirror. The facets of the mirror are divided along the circumference of the x-y plane using concave seams. For example, facets 301 and 300 are separated by seam 307. Facets are further divided by similar concave seams in the azimuth x-z, and y-z planes. For example, facets 300 and 302 are separated by concave seam 308. In some embodiments, the azimuthal seams 308 may be formed by increasing the curvature of the mirror in the region near the seam. For example, if a cross section of a facet of the mirror was a parabola with an equation y=3*x^2, then the azimuthal seam 308 might comprise parabolic regions with an equation y=7*x^2.

A separate sensor, such as a CCD or CMOS pixel array, is provided for each facet. The seams separating the facets provided overlapping images in regions on the edges of the sensors, allowing image stitching and preventing loss of rays from world points corresponding to the physical gaps between the sensors. This arrangement can be used to reduce the requirements for high-resolution sensors, for example as in the embodiment of FIG. 8.

Figure 10:
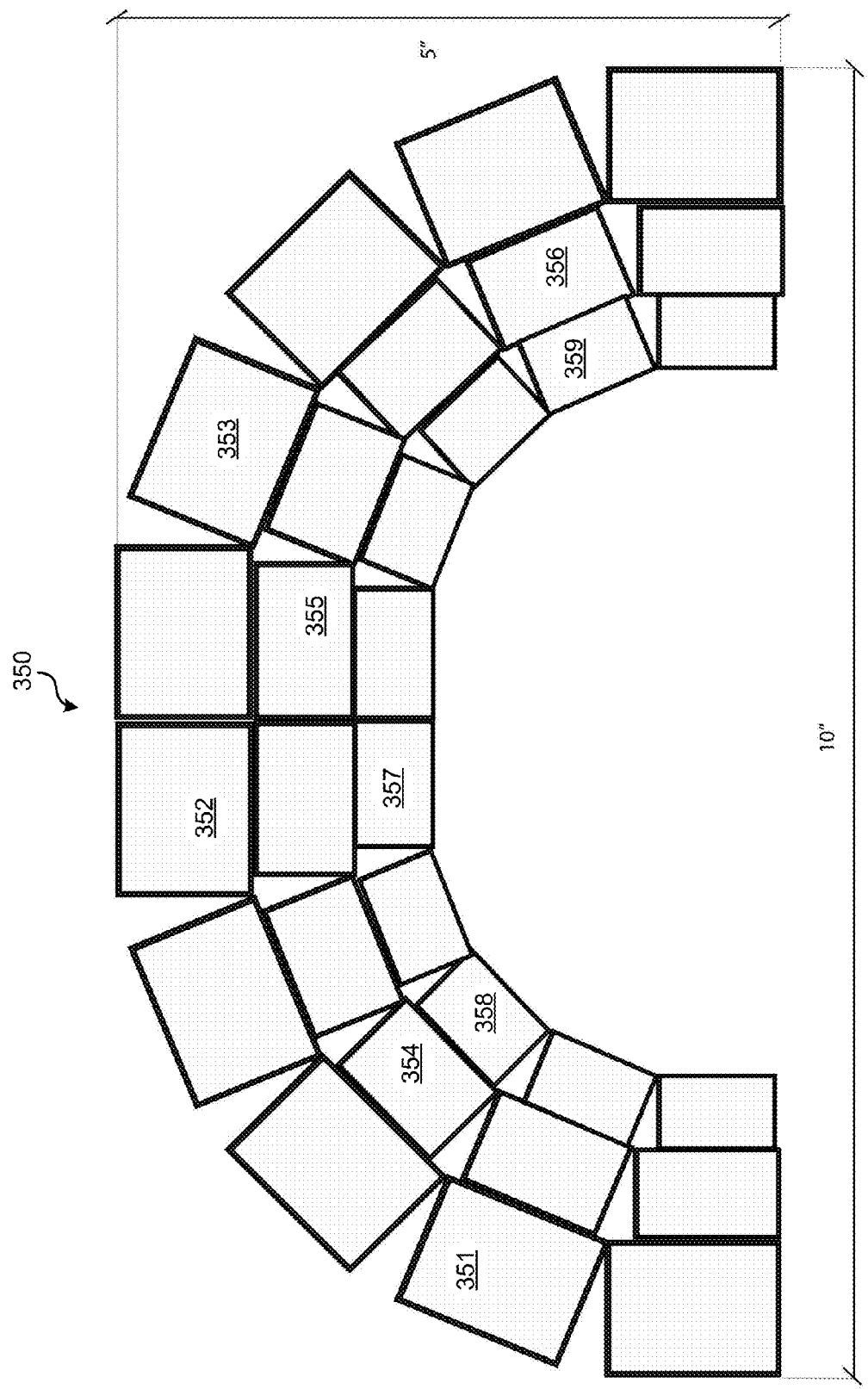
FIG. 10 illustrates a sensor array corresponding to half of the multi-facet mirror of FIG. 9.

The use of azimuthal facets also allows the use of the different resolution sensors corresponding to different zones within the field of view. FIG. 10 illustrates a sensor array corresponding to half of the multi-facet mirror of FIG. 9. In these embodiments, the multifacet mirror is divided into three azimuthal zones. An inner zone of facets, including facet 304, a middle zone of facets, including 302, 303, and 306, and an outer zone of facets, including 300, 301, and 305. The sensor array 350 is divided into corresponding zones of sensors of varying resolution. An inner zone of sensors, including sensors 358, 357, and 359, corresponds to the inner zone of facets. A middle zone of sensors, including sensors 354, 355, and 356, corresponds to the middle zone of facets. An outer zone of sensors, including sensors 351, 352, and 353, corresponds to the outer zone of facets. In some embodiments, the sensors in the different zones may have different resolutions. For example, the sensors in the outer zone may have twice the resolution of the sensors in the middle zone, which in turn have twice the resolution of the sensors in the inner zone. In some implementation, objects of interest will tend to be within a relatively small angle to the horizon. For example, all objects up to 270 m in height that are 1000 m away from the mirror will be within 15° of the equator of the mirror. The use of greater resolution sensors can compensate for the loss of acuity that would otherwise be present from the conversion of angular resolution to Cartesian resolution.

Figure 11:
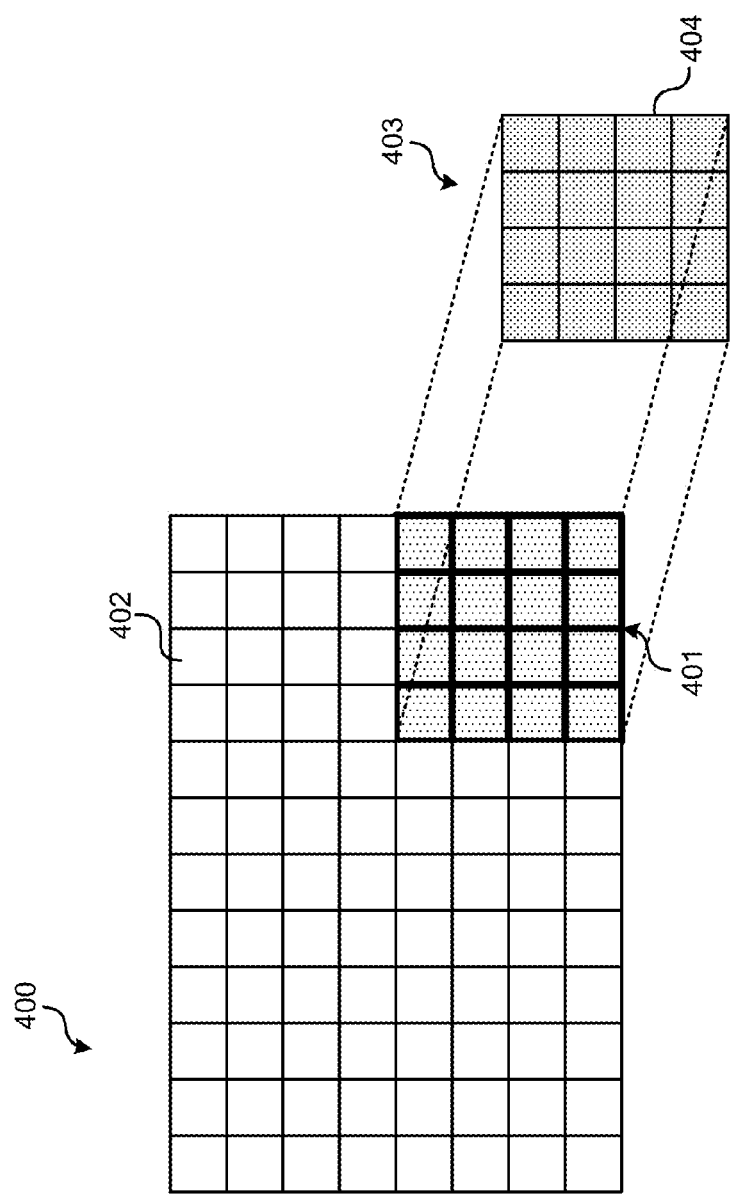
FIG. 11 illustrates a zoom-in operation implemented in accordance with an embodiment of the invention

Once an image of sufficiently high resolution is produced using a super-pixel array, mechanical and electro-optic zooming can be avoided without the use of electronic interpolation zooming. In some embodiment, an all electronic zoom is implemented based on spatial sampling rate switching. FIG. 11 illustrates a zoom-in operation implemented in accordance with an embodiment of the invention. After image stitching, an image 400 comprises an array of pixel values 402. Because of the high resolution obtained from the super-pixel array, the resolution of the image 400 is higher than what can be used by image monitor 403. In a zoom-in operation, a region 401 is selected from the image 400 and displayed on the image monitor 403. Without interpolation, a maximum resolution occurs when each pixel 402 of the image within region 401 is displayed by a pixel 404 of the image monitor. Pan and tilt operations may then be performed by translating the selected area 401 within the image 401.

Figure 12:
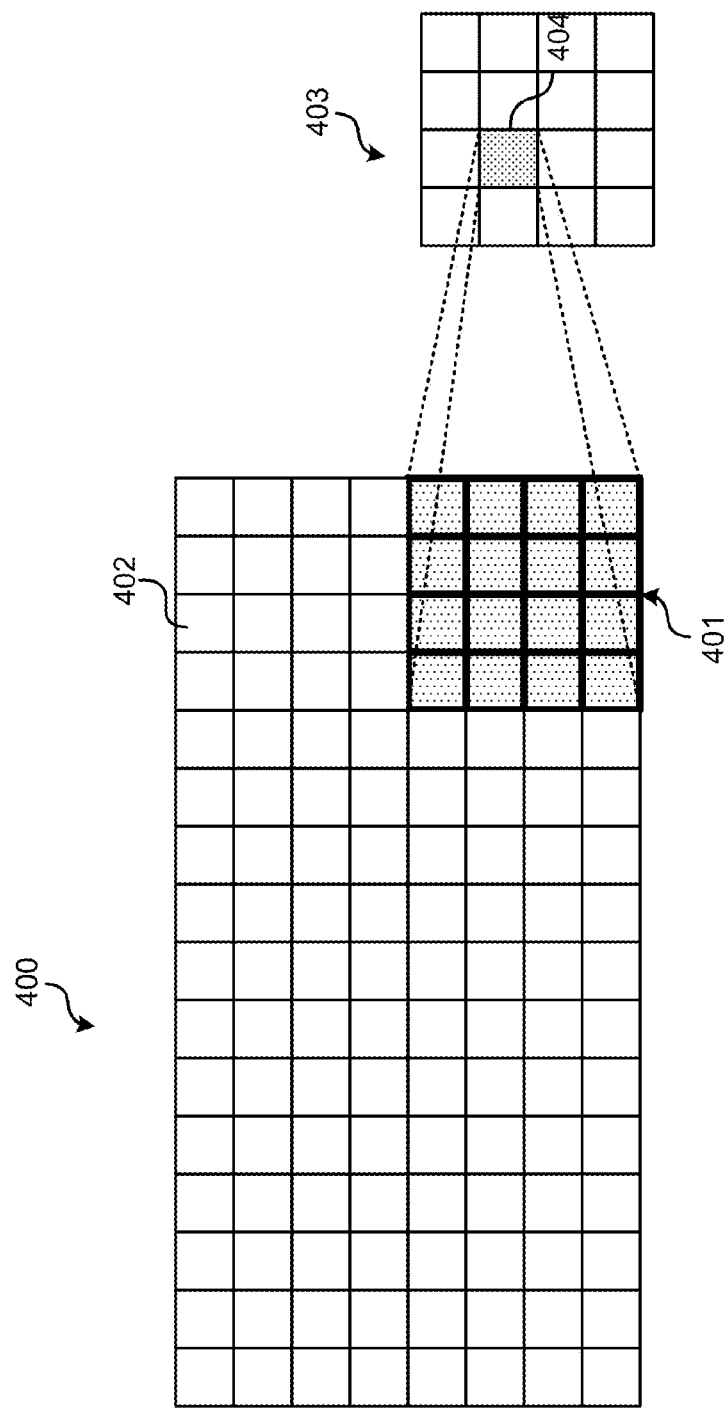
FIG. 12 illustrates a zoom-out operation implemented in accordance with an embodiment of the invention.

FIG. 12 illustrates a zoom-out operation implemented in accordance with an embodiment of the invention. Here, to display more of the image 400 on the image monitor 403, the pixel values 402 from a region of pixels 401 is correlated and displayed on a single pixel 404 of the image monitor 403. Zooming in and out on the image 400 may then be performed by correlating larger and small numbers of pixels 402 of the image and displaying the correlated regions on the image display 403.

Figure 13:
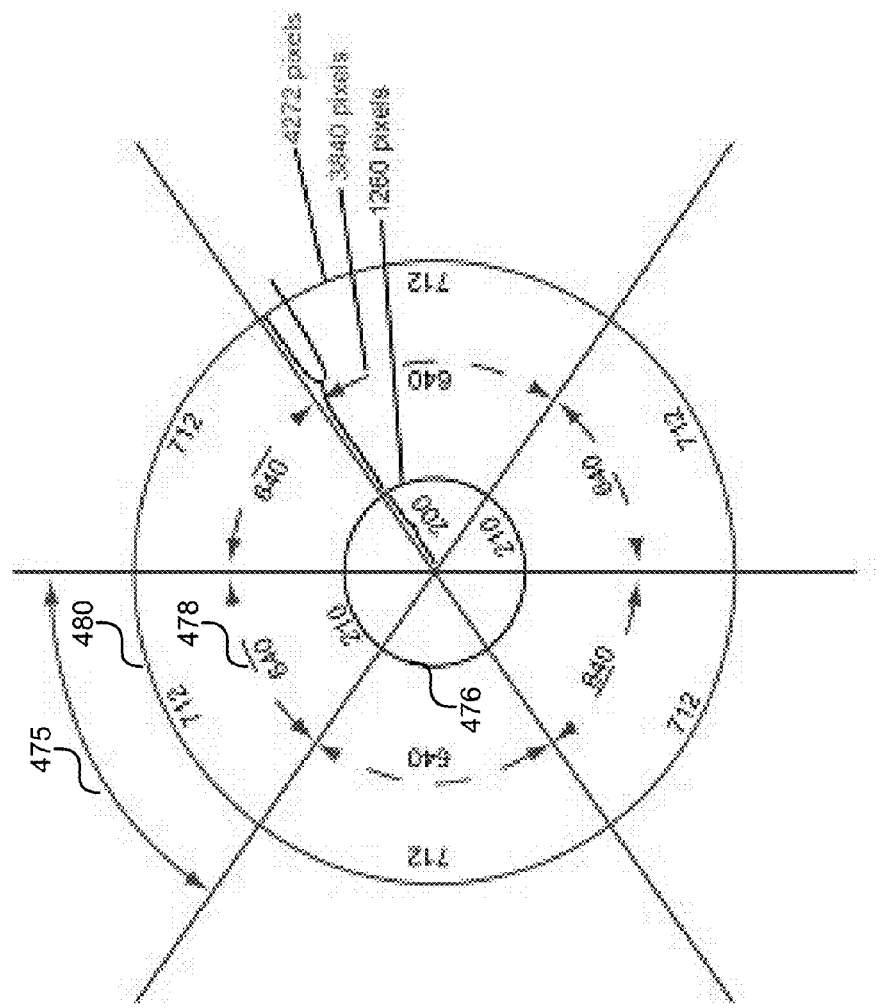
FIG. 13 illustrates angular resolution differences resulting from some mirror geometries.

In catadioptric imaging, constant angular resolution translates into a need for greater horizontal resolution near the outer circumference of the annular image when compared to the inner circumference. FIG. 13 illustrates this problem. In FIG. 13 the annular image resulting from an omni-directional imaging system is divided into 6 regions 475, each 60°. If the inner region 478, halfway between the inner radius and the outer radius, is to be mapped to a rectangular screen with 640 pixels per line of video, the inner circumference 476 must be imaged with 210 pixels per line per 60° and the outer circumference 480 must be imaged with 712 pixels per line per 60°. To achieve this, in some embodiments, a array of sensors corresponding to the needed outer resolution may be used. For example, here 6 image sensors may be arranged in a radial array, each more than 712 pixels×480 pixels (assuming a 640×480 image or video), as illustrated with respect to FIG. 8. In this embodiment, a 6 facet mirror may be used with the 6 facets arranged circumferentially. In order to allow for overlapping regions, in some embodiments, each of the 6 facets may be separated by seams configured to allow each facet to image slightly more than 60°, such as 63°. Alternatively, a multifacet mirror with facets arranged both circumferentially and azimuthally may be used to allow use of a multi-resolution sensor array, as discussed with respect to FIG. 9.

In addition to developing a sensor array with sufficient resolution, generally the image will be displayed in a rectangular, Cartesian grid. A variety of transforms from the polar annular image to a Cartesian display may be used. For example, in one embodiment, a surface transform is applied. Here, the annular image is mapped onto a surface, which is transformed directly onto the Cartesian grid without the treed for pixel-by-pixel transforms.

Generally, a 1360×1360 pixel omnidirectional image will exhibit quality similar to that of a standard definition image from a 60° field of view lens. The unwrapped image resolution will be about 3864×480 pixels. In order to produce electronic zoom the number of pixels must be an integer multiple of the base 1360×1360 resolution, as shown in Table 3.

TABLE 3

Dependence of Imaging Sensor Resolution on Zoom Factor

| Zoom | 1× | 2× | 4× | 6× | 8× | 10× |
|---|---|---|---|---|---|---|
| Resolution | 1360 × 1360 | 2720 × 2720 | 5440 × 5440 | 8160 × 8160 | 10880 × 10880 | 13600 × 13660 |

In further embodiments, all electronic frame stabilization can be implemented in image processing. Because the catadioptric system with multiple sensor arrays and with electronically implemented pan, tilt, and zoom, constitutes single rigid body, without moving parts, its motion can be electronically synchronized, with some fiducial point; or stable reference point, such as a star, or some static point at the ground. This may be implemented when the imaging system is installed on a moving platform, such as an avionic platform like a UAV (Unmanned Aerial Vehicle). In such a case, the catadioptric system is calibrated with a reference point that is static in respect to platform. The reference point is a specific fiducial world point and results in a fiducial pixel (FP) being an image of this point. If this image is deviating with respect to the FP, this deviation may be corrected electronically by electronically translating the viewing region, as described with respect to FIGS. 11 and 12. The catadioptric systems described herein can also work as a hyperspectral imager, or multi spectral imager, by applying expanded from visible into infrared, or UV.

Eqs. (4), (5), and (6) for the Nyquist criterion of catadioptric system, describe horizontal (azimuthal) digital resolution. For the vertical (elevation) digital resolution, equivalent of Eq. (6) has the form:

$$\frac{(FOV)r}{\delta r^{(v)}} = \frac{(FOV)\Delta N_r}{2}; \quad (8)$$

$$\Delta N_r = \frac{2r}{\delta r^{(v)}}$$

where the (FOV) is elevation (FOV), such as (+70°, −20°), or FOV (90°, $\delta r^{(v)}$-is vertical (elevation) resolving element, and $\Delta N_r$ is diagonal number of pixels, equivalent to this FOV. The equivalents of Eqs. (5) and (6) have the form:

$$\frac{1}{P_R^{(v)}} = \frac{\delta r^{(v)}}{r} \quad (9)$$

and $$\Delta N_r = 2 P_R^{(v)} \quad (10)$$

where $P_R^{(v)} = 1000$ is equivalent to vertical resolution of 1 mrad, or for example 1 m per 1 km (vertical).

In both horizontal and vertical resolutions, the resolving power, either $P_R$ (for, horizontal resolution), or $P_R^{(v)}$ (for vertical resolution) as in. Eqs. (6) or (10), respectively, is defined by equivalent number of pixels, $N_r$, or $\Delta N_r$. Of course, higher number of pixels, higher resolving power, in both horizontal and vertical cases. To achieve very high resolution, such as 2.5 cm resolution at 1 km distance, of 0.025 mrad, equivalent to resolving power of 40,000, in ultrawide field of view (FOV) of 360°×45°, or half-view of 180°×45° (tunable up to 90°), the resulting sensor, or the SPA, should have 125,000 pixels per line and a total of 30,000 semiannual lines. To achieve this array size, a larger number of low-resolution sensors, or PAs, can be multiplexed together. The physical gaps between the low-resolution sensor are obviated by the multifacet catoptric mirrors used in the catadioptric system, as described above. Such high resolution in the sensor device will provide very high detail without a need to mechanically change optical system focal length, as offered by prior mechanical zoom operations.

The multi-facet mirrors, for example as described with respect to FIGS. 5-9, are reflection type optical elements that compensate for the boundary effect by changing angular distribution of the reflected optical rays. In general, the reflective 360° optical light collecting device is based on a multi-facet mirror. This smooth mirror surface must be modified to compensate the gaps between sensor chips (or, PAs), by dividing the mirror surface into sections, as shown in the Figures. Each section covers slightly more than an equal division of the FOV. For example, a mirror with 4 facets arranged circumferentially might have each section (facet) covering ~93° FOV. This slight ~3° overlap compensates for the physical gap between the sensors. The final overlap angle will depend on the chip boundary thickness. In further embodiments, further modifications are used, such a some skew shift of rays in order to satisfy the single view point criterion of a catadioptric system. In other embodiments, the circular symmetry of the projection lens (eyepiece) is modified into multi-viewpoint topology of the catadioptric system. In some embodiments, the multi-viewpoint topology provides a viewpoint for each sensor of the sensor array. Digital image stitching and modification allows assembling the multiple images having multiple viewpoints into a single combined image.

Figure 14:
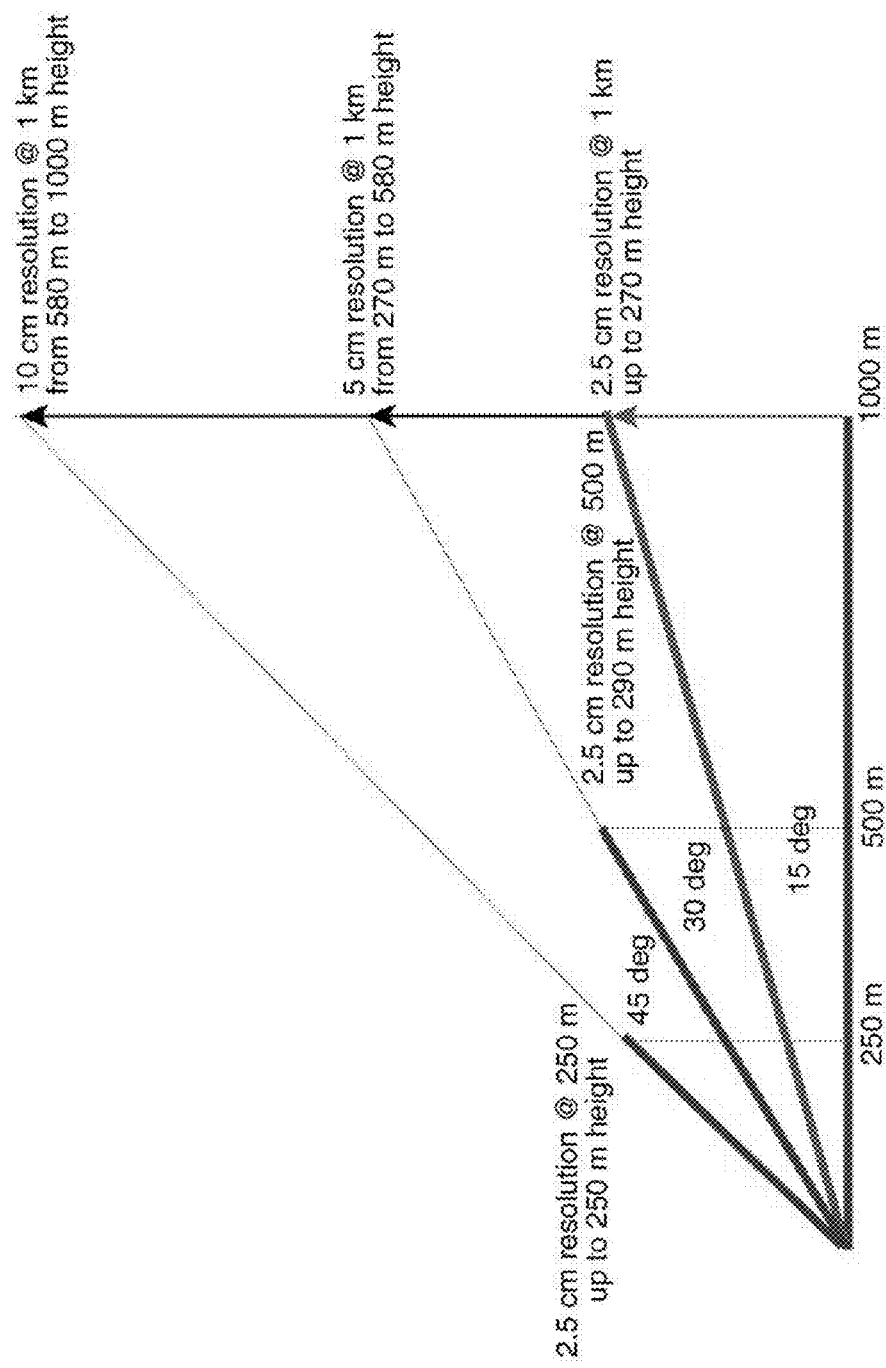
FIG. 14 illustrates the relationship between resolution and height in a catadioptric system.
Figure 15:
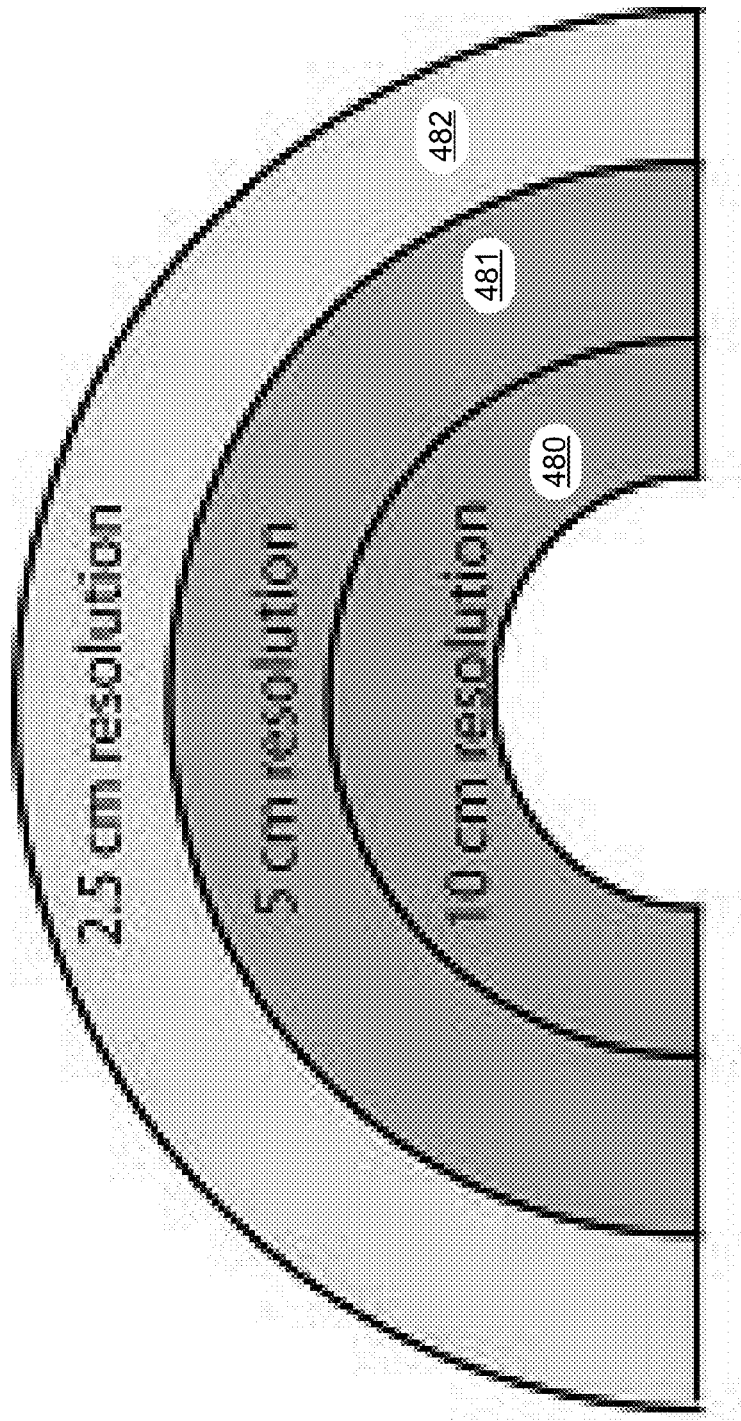
FIG. 15 illustrates a multi-zone azimuthal resolution deployment implemented in accordance with an embodiment of the invention.

The requirement for 40,000×80,000 resolution of the SPA, or super-pixel sensor array can be reduced based on the analysis of a 187°×45° FOV as a function of distance and elevation angle. As the distance increases, the elevation angle decreases at a constant resolving detail of 2.5 cm as shown in FIG. 14. The increased resolution near the horizon may be used in some implementations because more detailed imaging of sites near the horizon may be necessary. For example, physical object localization, for example, through trees or in buildings, typically requires higher resolutions near the horizon. With distance, even tall buildings are located at lower elevations. To image objects up to 250 m tall a 45° elevation angle is needed for object 250 m away, 30° at 500 m, and to 15° at 1000 m. Even at 1000 m, the height of objects covered at 2 cm resolution is 270 m, sufficient for urban terrain. The importance of this remark is that the resolution requirements can be reduced by dividing the sensor area into three semi-circles (zones) 480, 481, and 482 with different pixel densities as shown in FIG. 15. This azimuthal zone concept is discussed further with respect to FIGS. 9 and 10.

The non-uniform pixel density solution, and the zone concept, in general, can be applied to specific operative requirements, such as the sniper localization. Other operative requirements, such as: perioscopic vision, border control, and various video surveillance scenarios can dictate different zone distributions, and different pixel density distribution. In any case, me multi-facet zone mirrors can reduce the total number of pixels required, while preserving required resolution.

In summary, the zone mirror concept, generalizes the multi-facet mirror architecture from horizontal facets into both horizontal and vertical facets. It allows, in general, to further expand the total number of SPA pixels, to further increase resolution, both horizontal (azimuthal) and vertical (elevation) one. It allows, also, to differentiate pixel densities, according to the specific requirements in order to maximize system resolution.

In addition to spatial-seamless SPA/multi-facet firmware, some embodiments employ software based on temporally-spatially-seamless algorithm, eliminating temporal (and spatial) seams, by improved unwrapping and stitching. In particular, in the case of real-time video unwrapping, a standard transformation of circular polar coordinates to Cartesian coordinates at 30 frames per second ("fps"), is used. Previous pixel based transformations requires point-to-point interpolation and; thus, distort results. In some embodiments, surface-based image transformation are employed. Accordingly, resulting image will be only minimally distorted, because of this advanced transformation technology, applicable have to catadioptric systems that apply quasi-parabolic mirrors. In the multi-sectional (multi-facet) case, this transformation is applied to each quadrant and stitched, as explained below.

Conventional stitching algorithms for panoramic (catadioptric) imaging require prior information, and often require iterative search. These prior stitching methods cannot operate in real time (or, 30 fps), especially in high-resolution video with limited prior information. Some embodiments employ a suboptimal but effective stitching algorithm that will adaptively perform solution searches for video manipulation by means of temporal and progressive processing. Convergence time is evaluated to optimize this approach to meet resolution and display timing requirements. The process is based on gradient descent algorithms, which looks for a solution based on so-called cost functions to adjust (spatial) image seams with minimum visible transitions.

The basic principle of the proposal seamless approach is to minimize a cost function defined by a measure of dissimilarity between the derivations of the stitched image and the input images. Instead of a global evaluation for the derivatives, as in case of prior art approach, we provide this evaluation only for local overlapping regions, or other predefined regions, to evaluate the derivations and find a solution. The proposed method is only suboptimal for single-frame estimation, but the spatial domain evaluation is an integral part of temporal evaluation, which additionally improves the process of minimizing cost function. This method is effective under assumption that the video stream does not change dramatically from frame to frame (within a single scene), and that the variations are smooth. Changes of image characteristics are adaptively followed with weighted correlations according to the specific timeline, meaning that current data weights more heavily than the past data. The optimization procedure is as follows: In order to estimate stitched image (I), $\hat{I}$, the cost function, $C_d$, is minimized with respect to two input images, $I_1$, $I_2$, in the form:

$$C_d(I; I_1, I_2, w) = d(\nabla \hat{I}, \nabla I_1, t_1 \cup w, w) + d(\nabla \hat{I}, \nabla I_2, t_2 \cup w, U-w), \quad (11)$$

where w is a weighting value, T is the area in image, ω—is; the overlapped area, v-symbol means "within," and d is the distance between a and b, on c:

$$d(a, b, c, w) = \sum_{q \in c} w(q)\|a(q) - b(q)\|_p. \qquad (12)$$

The dissimilarity cost function, $C_d$, is defined by the distance between derivatives. The advantages of this method is that the dissimilarity function, $C_d$, is invariant to the overall (absolute) intensity of an image, and it is relatively insensitive to global difference between input images, if they are smooth.

The panoramic video display requires high resolution, typically 6432×1024 pixel resolution for a 4 megapixel omnidirectional images (2048×2048). Because of the limitations of display devices, including CRTs, LCDs, and projectors, panoramic imagery cannot be displayed at its native resolution, and thus is presented with less than the original image quality. Two levels of digital zoom are implemented; one lossless zoom and the other lossy. Lossless zooming manipulates and displays the image with quality less than or equal to that of the original image without interpolation (stretching). Lossy zooming interpolates the original image to an expanded image that is bigger than the zoom area's native resolution.

For motion stabilization purposes, in order to eliminate unwanted the motion of the camera, some embodiments compute the affine transform, a well-known transformation, that maps each frame into a given reference frame, selected from a sequence of frames corresponding to approximately one second of video. It is assumed that the video scene consists of static objects and moving objects, with the moving objects occupying significantly fewer pixels than the static fixed objects, from which camera motion is derived. The affine transformation matrix includes transformation from the reference point (x,y) into the current frame (x',y') in the form of orthogonal matrix, representing rotation angle $\theta$, and scale factor, s, plus translation vector: ($t_x$, $t_y$). We compensate only unwanted motion, while the slow and smooth intentional motion (zooming, penning, natural direction change) is preserved. The unwanted motion is abrupt, parasitic camera movements. These movements can be separated, intentional and un-wanted, by a low-pass filtering in the time domain, such as Kalman filtering.

Figure 16:
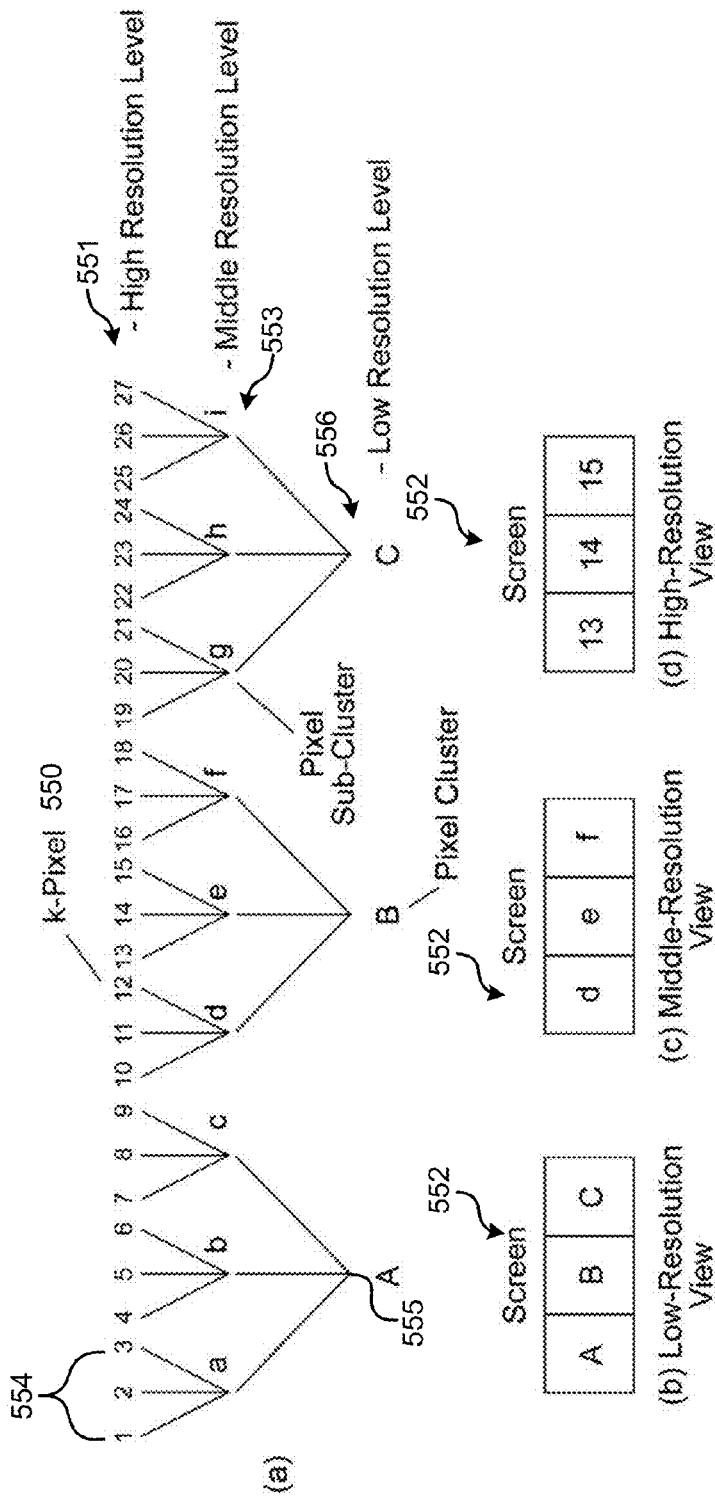
FIG. 16 illustrates a multi-zone digital display system implemented in accordance with an embodiment of the invention.

As described above, the entire panoramic FOV, up to 360° is recorded at once. Regions of interest are then selected electronically by software. Proper pixel clustering in the image device allows for a plurality of resolution levels. FIG. 16 illustrates this situation. At the highest resolution level 551 each pixel 550 is displayed on a separate pixel of the screen 552. As illustrated, this allows only a reduced region of the total image to be displayed at a given time. At the middle resolution level 553, clusters of pixels 554 are correlated into pixel values. These correlated pixel values are then displayed on screen 552. This allows a larger, but still reduced, region of the total image to be displayed. At the lowest resolution level 556, the clusters from the middle resolution 554 are further correlated to form clusters 555. These clusters are then displayed on the screen 552. For example, if the whole image has 27,000 horizontal pixels, then the middle resolution level may correlated 3 pixels (9 total when vertical pixels are included) per correlated pixel value to generate the values for level 553. Resulting in 9,000 effective horizontal pixels for the middle resolution level 553. Another round of correlating 3 pixels, results in a 3,000 effective horizontal pixels for the low resolution level 556.

The minimum number of superpixels, defining horizontal and vertical digital resolution, may be derived based on so-called Johnson resolution criterion rather than Nyquist criterion. The Johnson criterion defines the minimum number of linear pixels per target (an object of interest), for: detection (D), recognition (R) and identification (I), as: 5, 10, and 15, respectively. The resolving elements, $\delta l$, are calculated in Table 4 for vehicles (2.5 m×2.5 m) and personnel (1.2 m×1.2 m).

TABLE 4

Resolving elements, $\delta l$, According to Johnson Criterion, for Vehicles and Personnel

| Function | Vehicles (2.5 m × 2.5 m) | Personnel (1.2 m × 1.2 m) |
| --- | --- | --- |
| Detect (D) (5 Pixels per Target) | 50 cm | 26 cm |
| Recognize (10 Pixels per Target) | 25 cm | 12 cm |
| Identify (15 Pixels per Target) | 16.67 cm | 8 cm |

Figures 17A, 17B:
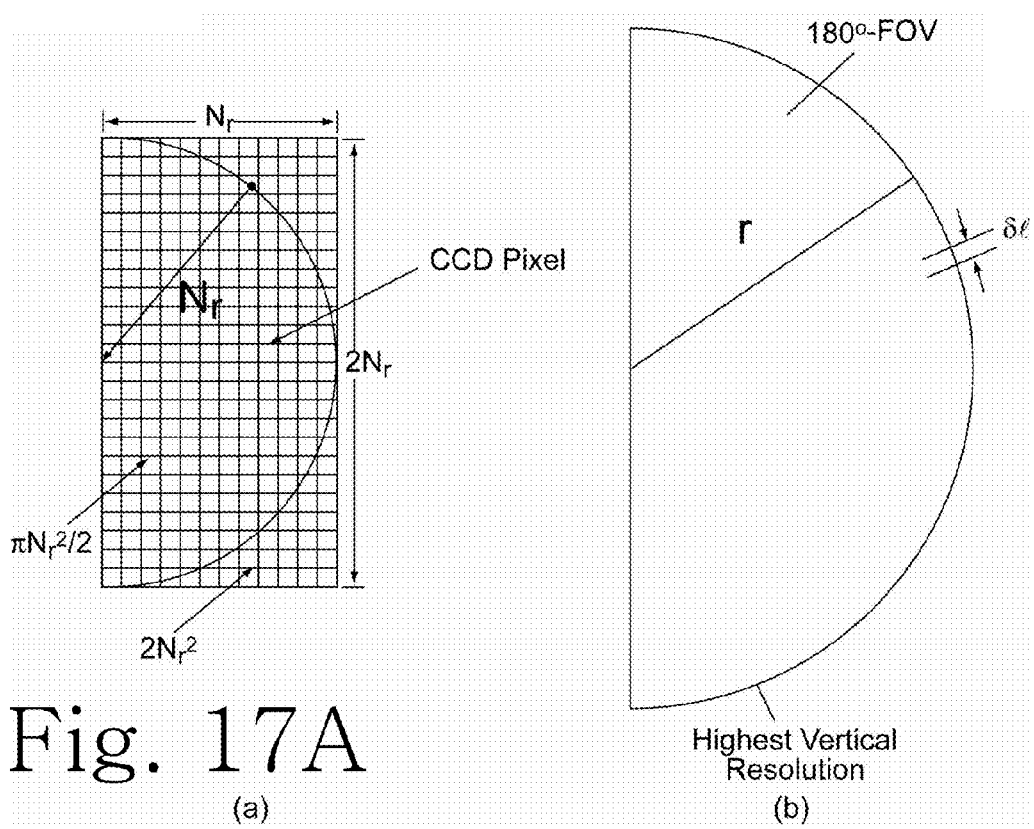
FIG. 17, consisting of FIGS. 17A and 17B, illustrates a catadioptric geometry for a panoramic 180° view system implemented in accordance with an embodiment of the invention.

In various embodiments, different total FOVs may be employed. For example, in some system, a 180° FOV is desirable instead of a 360° FOV. The multi-facet mirror systems allow increased sensor resolution in any FOV. FIG. 17, illustrates a catadioptric geometry for a panoramic 180° Field of View (FOV), with distance, r, and resolving element, $\delta l$. In FIG. 17A, the hemispheric FOV is presented, with total number of pixels equal to $2N_r^2$ and optimized total number of $(\pi/2)N_r^2$. From FIG. 17A.

$$\pi N_r = \frac{\pi r}{\delta \ell} \Rightarrow N_r = \frac{r}{\delta \ell} \qquad (13)$$

Comparing FIG. 17A with FIG. 2, $\delta r$ has been, replaced by $\delta l$, while, comparing Eq. (13) with. Eq. (4), $N_r$-value is twice smaller. This is because the Nyquist criterion has been replaced by more practical Johnson criterion where $\delta r$ and $\delta l$ are defined differently (i.e., two pixels per $\delta r$, while: 5, 10, or 15 pixels per $\delta l$.

The minimum number of superpixels depends on the catadioptric geometry, in the form:

$4N_r^2$–Un-optimized spheric (360°) FOV  (14a)

$\pi N_r^2$–Optimized spheric (360°) FOV  (14b)

$2N_r^2$–Un-optimized hemispheric (180°) FOV  (14c)

$(\pi/2)N_r^2$–Optimized hemispheric (180°) FOV  (14d)

where $N_r$—value is obtained from Eq. (13). Of course, finding any of them is sufficient to find all of them by constant factor multiplication.

Tables 5 and 6 summarize the minimum superpixel numbers, by applying Eq. (14b) for optimized spheric FOV, for target detection (D), recognition (R) and identification (I) by using the Johnson criteria for vehicles and people. The highest number: $9.91 \cdot 10^{10} = 49.1$ Gp, is for personnel identification for 10 km—distance.

TABLE 5

Minimum Superpixel Numbers of Vehicles (2.5 m × 2.5 m), for Various Distances, Assuming Optimized Spheric (360°) FOV, for Detection (D), Recognition (R), and Identification (I)

| Distance (r) | 500 m | 1 km | 2 km | 5 km | 10 km |
| --- | --- | --- | --- | --- | --- |
| D | $3.14 \cdot 10^6$ | $1.26 \cdot 10^7$ | $5 \cdot 10^7$ | $3.14 \cdot 10^8$ | $1.26 \cdot 10^9$ |
| R | $1.26 \cdot 10^7$ | $5 \cdot 10^7$ | $2 \cdot 10^8$ | $1.26 \cdot 10^9$ | $5 \cdot 10^9$ |
| I | $2.8 \cdot 10^7$ | $1.13 \cdot 10^8$ | $4.52 \cdot 10^8$ | $2.8 \cdot 10^9$ | $1.13 \cdot 10^{10}$ |

TABLE 6

Minimum Superpixel Numbers of Personnel (1.2 × 1.2 m), for Various Distances, Assuming Optimized Spheric (360°) FOV, for Detection (D), Recognition (R), and Identification (I)

| Distance (r) | 500 m | 1 km | 2 km | 5 km | 10 km |
|---|---|---|---|---|---|
| D | $1.36 \cdot 10^7$ | $5.45 \cdot 10^7$ | $2.18 \cdot 10^8$ | $1.36 \cdot 10^9$ | $5.49 \cdot 10^9$ |
| R | $5.45 \cdot 10^7$ | $2.18 \cdot 10^8$ | $8.72 \cdot 10^8$ | $5.45 \cdot 10^9$ | $2.18 \cdot 10^{10}$ |
| I | $1.23 \cdot 10^8$ | $4.91 \cdot 10^8$ | $1.96 \cdot 10^9$ | $1.23 \cdot 10^{10}$ | $4.91 \cdot 10^{10}$ |

It should be noted that any value of Tables 5 and 6 is a minimum value, obtained for resolving element size, $\delta l$, defining minimum pixel pitch (i.e., distance between two sequent pixels). Therefore, any number of linear pixels larger than this minimum value also satisfies the Johnson criterion for other eases with lower $N_r$—values. Consider, for example, vehicle recognition (R) at distance 2 km, with $\pi N_r^2$—value equal to $2 \cdot 10^8$, according to Table 5. Assume, that the number of superpixels is $3 \cdot 10^8$, for example. Then, personnel recognition at distance 1 km, with $\pi N_r^2 = 2.18 \cdot 10^8$, according to Table 6 also satisfies the Johnson criterion. However, vehicle recognition at distance 5 km, with $\pi N_r^2 = 1.26 \cdot 10^9$, does not satisfy the Johnson criterion, since $3 \cdot 10^8$ is smaller number than $1.26 \cdot 10^9$.

In FIG. 17A, the pixels located at the circle with radius $N_r$ represent the highest vertical resolution, while pixels located at the circle with radius smaller than $N_r$ represent respectively lower vertical resolution. When the catadioptric is located at zero elevation, for example, typically the highest vertical resolution at zero elevation is assumed, with proportionally lower resolution levels at higher elevations, as in FIG. 17B. When the catadioptric system is located at higher elevation (e.g., located on a tower, or on a hill), however, we have also negative elevation angles, as illustrated in FIG. 1, FOV 46. In general, azimuthal mirror facets, as discussed with respect to FIG. 9, can be always adjusted in order to maximize vertical resolution for any specific elevation required.

On average, the number of vertical pixels required is determined by the following equation:

$$\Delta N_r = \frac{r \cdot \Delta \phi}{\delta \ell} \leq N_r, \tag{15}$$

$$\text{if } \Delta \phi \leq 1 = 57.3°$$

where $\Delta \phi$ defines vertical FOV. The vertical FOV, should be smaller than 57.3°, in order to satisfy, (in average), the pixel geometry of FIG. 17A. The vertical resolution reduction, is defined by the formula:

$$(N_r)_e = N_r - \Delta N_r = \frac{r}{\delta \ell}(1 - \Delta \phi) \tag{16}$$

For example, for $\Delta \phi = 30° = \pi/6 = 0.52$, we obtain $$(N_r)_e = \frac{r}{\delta \ell}\left(1 - \frac{\pi}{6}\right) = 0.48 \, N_r \tag{17}$$

while for $\Delta \phi = 45° = \pi/4 = 0.785$, and $(N_r)_e = 0.215 \, N_r$; i.e., at the highest elevation (45°), the vertical resolution is reduced by 78.5%. Therefore, in the case of observation, of aerial objects, for example, the vertical resolution should be optimized to respectively higher elevation levels.

In further embodiments, software processing systems may be used to provide automatic motion detection and tracking capability based on real-time PRE-ATR (or, RT/PRE-ATR) techniques. Conventional automatic Target Recognition (ATR) method based on Fourier processing, may be difficult to implement in some situations because it is not real-time with current computing technology, and it is not scale and/or rotation invariant. In contrast, the RT/PRE-ATR is a simplified object recognition system that could allow object recognition in real-time and it is scale/rotation-invariant; thus, avoiding the ATR problems. It has a number of automatic steps. First, the embodiment produces a silhouette or profile of an object (human, animal, car, tank). based on: pixel-by-pixel frame subtraction, object edge extraction (based on novelty filtering) using such parameters as: mean square error, peak signal-to-noise ratio (PSNR), profile polar distribution and polar compliance parameter. Having a number of pixels per object (observed by the E-ZOOM), and angular resolution per object, $\delta \phi$, obtained from the formula:

$$(\delta \phi)(\pi N_r) = \pi \Rightarrow \delta \phi \cdot N_r = 1 \Rightarrow \delta \phi = \frac{1}{N_r} \tag{18}$$

the angular sizes of (usually moving) object may be found by automatic pixel counting. However, from the RT/PRE-ATR, or other pattern recognition method, the object is recognized; i.e., since the type of an object (car, human, etc.) is known; so, the (real) linear sizes, $\delta a$, of the object are also known because:

$$\delta \phi = \frac{\delta a}{r} \tag{19}$$

i.e., by knowing $\delta \phi$ and $\delta a$, the r-distance value can be found (it should be emphasized that, since, the operation is not manual, the real distance of an object is not known).

Assuming that the object is in motion, the real velocity, v, can also be automatically found from the following formula:

$$v = \frac{\Delta s}{\Delta t} = \omega r = \left(\frac{\Delta \phi}{\Delta t}\right)r = \left(\frac{N_m \cdot \delta \phi}{\Delta t}\right)r \tag{20}$$

where: $\omega$-angular velocity, $N_m$—number of pixels passed during the object motion, $\Delta t$—time duration, while $\delta \phi$ and r-values are known. It should be noted that r-object distance can be function of time;

$$r = r(t) \tag{21}$$

where, by knowing relation (21) we can also find the object velocity vector $\bar{v}$; i.e., if terrestrial object is moving away or it is coming closer. For aerial objects (aircraft, helicopter, UAV), there are three $\bar{v}$-vector components. For example, for $N_r = 8000$ (thus, $\delta \phi = 1.25 \cdot 10^{-4}$), $N_m = 100$, $\Delta t = 1$ sec, and $r = 1$ km, we obtain v=12.5 m/sec=45 km/h.

The RT/PRE-ATR allows identification of regions of interest ("ROIs"), including both moving and stationary objects, based on edge extraction, within entire panoramic view: 180°×45°. This ROI identification may be used for a variety of purposes, for example, for recording purposes. In one embodiment the automatically identified ROIs are compressed (e.g., by MPEG-4), without perceptual information loss, with a first compression ratio, such as $C_1 200:1$, while remaining background is compressed with a greater compression ratio, such as $C_2=2000:1$. Then, the average compression ratio, C, is:

$$\frac{1}{C} = \frac{k}{C_1} + \frac{(1-k)}{C_2} \quad (22)$$

where k is the fraction of the image occupied by ROIs. For example, for $C_1=200:1$, $C_2=2000:1$, and k-0.01 (1%), C=1852.

Assuming a total number of CCD superpixels equal to 1 Gp, for example, with 24 bpp (RGB), and frame rate: (FR)=1 fps. Then, uncompressed bandwidth; $B_o=(10^9)$ (24) (1)=24 Gbps, and compressed bandwidth, $B=(b_o/C)=(24\cdot10^9)/(1852)=15.8$ Mbps. Therefore, the required information capacity, V, for 48 hours of recording, is $$V=(15.8\cdot10^6)(48)(3600)=337 \text{ GB} \quad (23)$$

Figure 18:
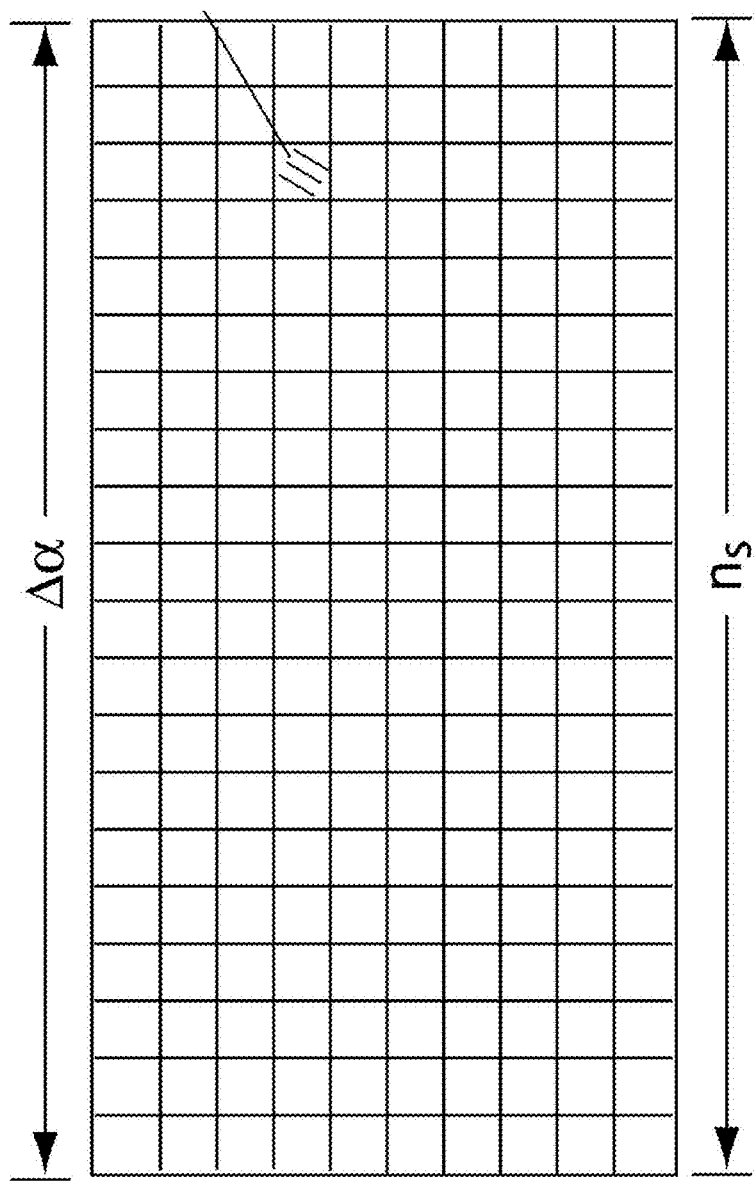
FIG. 18 illustrates a display screen field of view implemented in accordance With an embodiment of the invention.

For visualization purposes, assume a display with $n_s$—number of horizontal display pixels (vertical display pixels can be calculated analogously which is especially important for aerial objects), and equivalent number of CCD superpixels, Ns, where:

$$N_s = \left(\frac{\Delta\alpha}{\pi}\right)(\pi N_r) = (\Delta\alpha)(N_r) \quad (24)$$

where $\Delta\alpha$ is display screen horizontal FOV, as shown in FIG. 18.

The term "clusterization ratio", $\epsilon$, is:

$$\varepsilon = \frac{N_s}{n_s} = \frac{(\Delta\alpha)\cdot N_r}{n_s} \quad (25)$$

where $N_s$ is given by Eq. (24), while $n_s$—is given number of horizontal display pixels (FIG. 18).

Further embodiments of the invention provide modules configured to provide de-blurring. In the case of the objects moving with maximum horizontal velocity, $v_o$, and $\delta t$—time between two sequent video frames, where:

$$(FR) = \frac{1}{\delta t} \quad (26)$$

and (FR) is frame rate, the pixel de-blurring condition is calculated from the following equation:

$$\frac{v_o \cdot \delta t}{r_o} = \delta\beta \quad (27)$$

where $r_o$—minimum object distance and $\delta\beta$ is angular display pixel pitch, related to the CCD superpixel pitch by clusterization ratio:

$$\delta\beta = \varepsilon \cdot \delta\phi = \frac{\varepsilon}{N_r} \quad (28)$$

where $\epsilon$-coefficient is given by Eq. (25). This relation is because: $(\delta\phi)(\pi N_r) = \pi \Rightarrow (\delta\phi)(N_r)=1$. By substituting Eq. (28) into Eq. (27):

$$\frac{v_o \cdot \delta t}{r_o} = \frac{\varepsilon}{N_r} = \frac{\Delta\alpha}{n_s} = \delta\beta \quad (29)$$

or, by using Eq. (26):

$$(FR) = \frac{v_o}{r_o} \frac{n_s}{\Delta\alpha} = \frac{v_o}{r_o} \frac{1}{\delta\beta} \quad (30)$$

where $\delta\beta$ is angular distance between display pixels. Equation (30) is the basic relation, defining minimum frame rate required to avoid de-blurring. We see that this relation depends only on object kinematic ($v_o$, $r_o$)—parameters and display parameters: $n_s$, $\Delta\alpha$. It should be noted that $\delta t$-parameter can be also considered as a exposure time. In such a case $\delta t$-value can be small than that from Eq. (26): i.e., $\delta t < (FR)^{-1}$.

By introducing Eq. (25), $$(FR) \cdot \varepsilon = \frac{v_o N_r}{r_o} \quad (31)$$

Accordingly, given kinematic parameters: $v_o$, $r_o$, and given E-ZOOM parameter, $N_r$; then, with (FR) and $\epsilon$ remain unknown until we display parameters: $\Delta\alpha$ and $n_s$, are defined. Then, both (FR) and $\epsilon$ will be fixed. Therefore, in order to avoid deblurring, all three types of parameters ($N_r$), kinematic ($r_o$, $v_o$), and display ($\Delta\alpha$, $n_s$) should be determined. In typical implementations, the parameters: $r_o$, $v_o$, $N_r$, and $n_s$, are given and the software has the flexibility to adjust:

$$\Delta\alpha \Rightarrow \epsilon, \text{ from Eq. (25)} \quad (32)$$

and also, $$\epsilon \Rightarrow (FR), \text{ from Eq. (31)} \quad (33)$$

Thus, the video visualization must be adjusted by software into given kinematic, display, and catadioptric conditions, defined by the following parameters: $v_o$, $r_o$, $n_s$, and $N_r$. In addition $N_r$-number is defined by Eq. (13). This situation is illustrated by Table 7 which is determined by resolving element, $\delta l$, and $\Delta\alpha$-value, such as: $\delta l=10$ cm and $\Delta\alpha=\pi=180°$, for example. Therefore, starting from $r_o$ and $\delta l$, we obtain Nr-value, and for $v_o$, =1.00 km/h=27.8 m/sec, we obtain (FR)-values, for given, $r_o$-values, by using Eq. (30). Then, from Eq. (31), we obtain, $\epsilon$-values. We see that we need to assume rather high $r_o$-values, in order to obtain relatively low frame rates, while $\epsilon$-values are still high, even for large $\Delta\alpha=\pi=180°$.

TABLE 7

Frame Rate (FR) and $\epsilon$-Values for Various Minimum Distances, $r_o$, Assuming: $v_o = 100$ km/h, $\Delta\alpha = \pi = 180°$, $\delta l = 10$ cm, $n_s = 1000$

| $r_o$ | 500 m | 1 km | 2 km | 5 km | 10 km |
|---|---|---|---|---|---|
| $N_r$ | 5000 | 10,000 | 20,000 | 50,000 | 100,000 |
| (FR) | 16.4 fps | 8.2 fps | 4.1 fps | 1.77 fps | 0.88 fps |
| $\epsilon$ | 15.7 | 31.4 | 62.8 | 157 | 314 |

The visualization structure is defined by the following technology elements; where their representative eight (8) parameters are also given:
1) Software ($\epsilon$)
2) Visualization ($n_s$, $\Delta\alpha$)
3) E-ZOOM Sensor ($N_r$)
4) Kinematics ($v_o$, $r_o$)
5) Resolution ($\delta l$)
6) Video (FR)

The object kinemetrics ($v_o$, $r_o$) and object resolution ($\delta l$) define sensor ($N_r$), and, as a result, Equation (31) is given, with defined product: (FR)·$\epsilon$. Then, by adding visualization parameter: $\delta\beta=\Delta\alpha/n_s$, Eqs. (25) and (31) are obtained, defining parameters: (FR) and $\epsilon$, separately.

Figure 19:
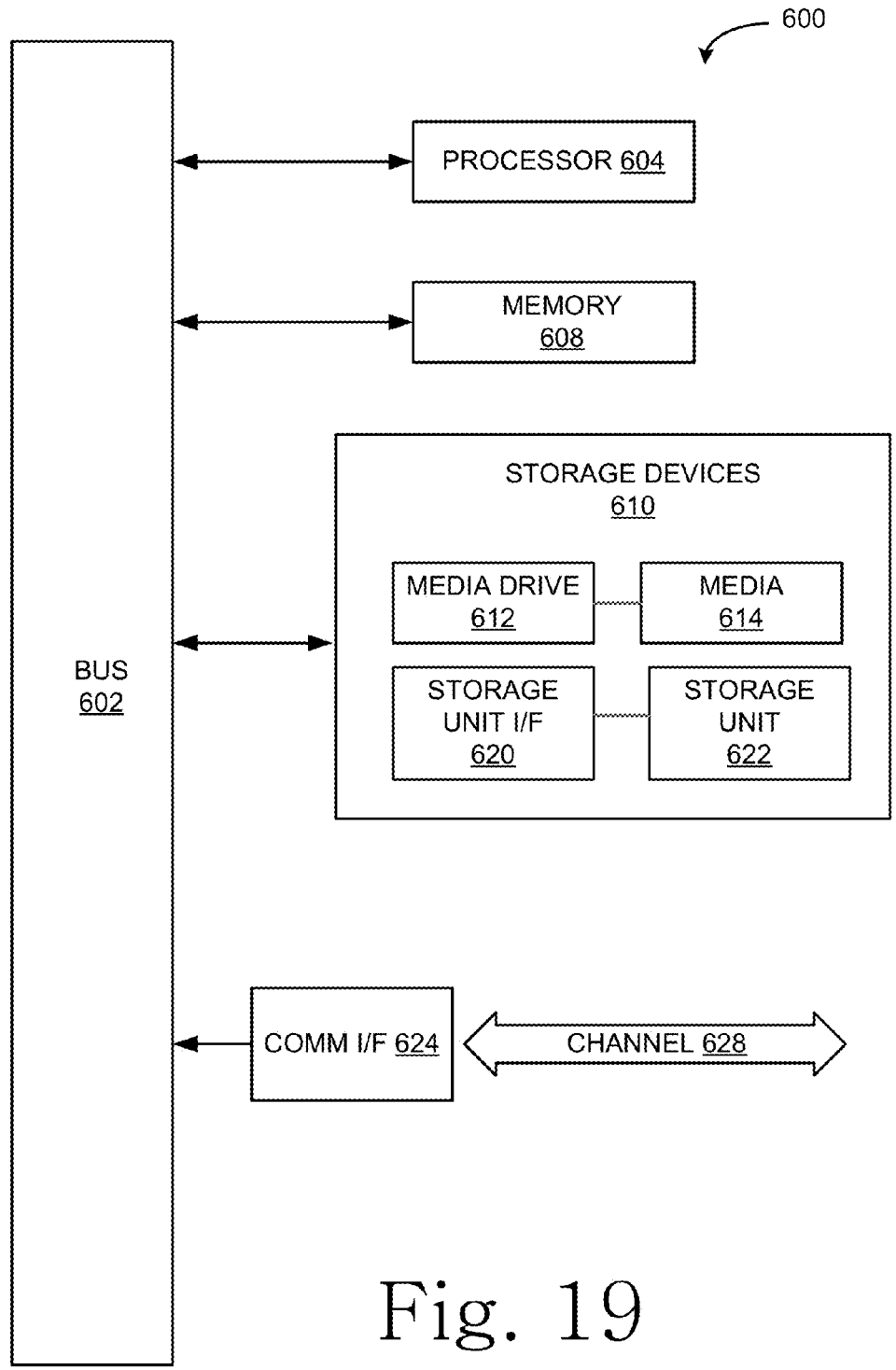
FIG. 19 illustrates an example computing module that may be used in implementing various features of embodiments of the invention.

As used herein, the term catoptric refers to reflection optics, the term dioptric refers to lens and pinhole optics, and the term catadioptric refers to combinations of reflection and lens or pinhole optics. As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 19. Various embodiments are described in terms of this example-computing module 600. After reading this description, it will become apparent to a person skilled in the relevant art how to implement the invention using other computing modules or architectures.

Referring now to FIG. 19, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600, Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet network interface card, WiMedia, IEEE 802.XX or other interface), a communications port (such as for example, a USB port, IR port, RS232 port Bluetooth® interlace, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A system comprising an image stitching module configured to:

receive a plurality of images from a corresponding plurality of image sensors arranged in an array, images of the plurality of images having a central region comprising an image from a single facet of a multifaceted imaging structure and an edge region comprising an image from an imaging region between two facets of the multifaceted imaging structure, wherein the imaging region between the two facets is configured to direct light from a world point within a first field of view of the multifaceted imaging structure onto two of the sensors of the plurality of sensors;

combine the plurality of images into a composite image using the edge regions from the plurality of images; and provide the composite image to an image display module or an image recording module.

2. The system of claim 1, further configured to apply surface-based image transforms to the plurality of images to project the images onto a rectilinear system.

3. The system of claim 1, wherein the step of combining the plurality of images into a composite image comprises applying a gradient descent algorithm based on a predetermined cost function.

4. The system of claim 3, wherein the cost function is configured to minimize visible transitions between images by spatially translating the images.

5. The system of claim 3, wherein combining the plurality of images comprises calculating image derivatives between successive image frames within the edge regions.

6. The system of claim 3, wherein combining the plurality of images comprises calculating image derivatives between successive image frames within the edge regions without calculating derivatives between successive image frames within the central regions.

7. The system of claim 3, wherein combining the plurality of images comprises minimizing the cost function, $C_d$, with respect to two input images, $I_1$, $I_2$, in the form:

$$C_d(I; I_1, I_2, w) = d(\nabla \hat{I}, \nabla I_1, t_1 \cup w, w) + d(\nabla \hat{I}, \nabla I_2, t_2 \cup w, U - w)$$

where w is a weighting value, $t_1$ is the area of image, i, $\omega$ is the area of the edge regions, $\hat{I}$ is an estimate of the composite image, and d is a distance function where $$d(a, b, c, w) = \sum_{q \in c} w(q) \|a(q) - b(q)\|_p.$$

8. The system of claim 1, further comprising an image display module configured to receive the composite image and configured to display a reduced resolution portion of the image on a display device by correlating pixel values from predetermined subsets of the composite image and displaying the correlated pixel values on the display device.

9. The system of claim 1, further comprising an image display module configured to:
receive the composite image and to select a region of the composite image and display the region of the composite on the display device, and
to pan the displayed portion of the image by translating the selected region.

10. The system of claim 9, wherein the image display module is further configured to perform electronic frame stabilization by identifying the image of a reference world point as a reference point and translating the selected region to maintain the position of the image within the selected region with respect to the reference point.

11. The system of claim 1, further comprising a pattern recognition module configured to identify a silhouette or profile of a predetermined object within the composite image.

12. The system of claim 11, wherein identifying the silhouette or profile comprises performing pixel-by-pixel frame subtraction or object edge extraction based on mean square error, peak signal-to-noise ratio, profile polar distribution, or polar compliance parameters.

13. The system of claim 11, further comprising an image compression module, configured to receive information regarding the identified silhouettes or profiles within the composite image from the pattern recognition module and configured to compress the composite image by compressing image regions within the identified silhouettes or profiles with a first compression ratio and compressing image regions outside the identified silhouettes or profiles with a second compression ratio.

14. The system of claim 1, wherein the multifaceted imaging structure comprises a plurality of facets, and each facet of the imaging structure includes a focal point corresponding to a corner of a different image sensor of the plurality of image sensors.

15. The system of claim 1, wherein the facets of the multifaceted imaging structure are convex facets, the imaging region between two facets comprises a concave seam, and the imaging region between two facets comprises a concave seam created by edge regions of adjacent convex facets.

16. The system of claim 1, wherein the facets of the multifaceted imaging structure are convex facets, the imaging region between two facets comprises a concave seam, and curvatures of the convex facets on either side of a concave seam result in redundant imaging on edges of corresponding image sensors.

17. The system of claim 1, wherein the facets of the multifaceted imaging structure are convex facets, the imaging region between two facets comprises a concave seam, and curvatures of the convex facets on either side of a concave seam result in rays from a given world point being mapped to edges of two adjacent image sensors.

18. The system of claim 1, wherein the plurality of image sensors comprises a separate sensor for each facet of the multifaceted imaging structure.

* * * * *